(12) United States Patent
Petty et al.

(10) Patent No.: US 6,342,907 B1
(45) Date of Patent: Jan. 29, 2002

(54) SPECIFICATION LANGUAGE FOR DEFINING USER INTERFACE PANELS THAT ARE PLATFORM-INDEPENDENT

(75) Inventors: Douglas Robert Petty, Rochester, MN (US); Scott Anthony Sylvester, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/174,709

(22) Filed: Oct. 19, 1998

(51) Int. Cl.[7] .................................................. G06F 3/00

(52) U.S. Cl. ........................ 345/762; 345/708; 345/760; 345/798

(58) Field of Search ................................. 345/326, 333, 345/334, 335, 336, 338, 339, 340, 342, 700, 705, 708, 744, 746–747, 760, 762, 781, 788, 798–801, 764–765; 709/203, 300, 302, 303, 310, 315, 328

(56) References Cited

U.S. PATENT DOCUMENTS

| | | | | |
|---|---|---|---|---|
| 5,179,657 A | * | 1/1993 | Dykstal et al. | 345/762 |
| 5,347,627 A | * | 9/1994 | Hoffmann et al. | 345/762 |
| 5,347,629 A | * | 9/1994 | Barrett et al. | 345/762 |
| 5,923,885 A | * | 7/1999 | Johnson et al. | 717/11 |
| 6,005,568 A | * | 12/1999 | Simonoff et al. | 345/744 |
| 6,054,983 A | * | 4/2000 | Simonoff et al. | 345/738 |

OTHER PUBLICATIONS

Nigam et al., "Platform Independent Tool for Designing Quality Graphical User Interfaces," BIWIT '97, Proceedings of the Third Basque International Workshop on Information Technology, pp. 54–61.*

Khare et al., "XML: A Door to Automated Web Applications", IEEE Internet Computing, vol. 1, issue 4, pp. 78–87, Jul.–Aug. 1997.*

Baker, "Using Server Side XML to Create Individualized Web Pages", Professional Communication Conference, 1998, vol. 2, pp. 317–319.*

Rein, "XML–Enabled Tools [New Products]", IEEE Internet Computing, vol. 2, issue 3, pp. 16–19, May–Jun. 1998.*

* cited by examiner

Primary Examiner—Crescelle N. dela Torre
(74) Attorney, Agent, or Firm—Martin & Associates, LLC; Derek P. Martin

(57) ABSTRACT

A specification language allows a user to define platform-independent user interface panels without detailed knowledge of complex computer programming languages. The specification language is referred to herein as a Panel Definition Markup Language (PDML), which defines tags that are used in similar fashion to those defined in Hypertext Markup Language (HTML), that allow a user to specify the exact location of components displayed in the panel. A graphical editor allows the creation and modification of platform-independent user interface panels without programming directly in the specification language. A conversion tool may be used to convert platform-specific user interface panels to corresponding platform-independent user interface panels. A help generator tool also facilitates the generation of context-sensitive help for a user interface panel.

33 Claims, 22 Drawing Sheets

Microfiche Appendix Included
(1 Microfiche, 43 Pages)

Windows Resource Script

```
IDD_SUPPORTED_COMPONENTS DIALOG DISCARDABLE 0, 0, 400, 300
STYLE DS_MODALFRAME | WS_POPUP | WS_CAPTION | WS_SYSMENU
CAPTION "Panel Manager - Test of Supported Components"
FONT 8, "MS Sans Serif"
BEGIN
  DEFPUSHBUTTON  "OK",IDOK,109,279,50,14
  PUSHBUTTON     "Cancel",IDCANCEL,175,279,50,14
  PUSHBUTTON     "Help",IDHELP,241,279,50,14
  LTEXT          "1. Ordinary label",IDC_LABEL,7,7,124,8
  LTEXT          "2. Multiline label. If you can't see all of the text in this label, there is
                  something wrong.", IDC_MULTILINE,7,25,124,17
  GROUPBOX       "3. Group box. ",IDC_GROUPBOX,7,51,124,73
  CONTROL        "4. Button 1 of 3",IDC_RADIO1,"Button",
                  BS_AUTORADIOBUTTON | WS_TABSTOP,17,66,58,10
  CONTROL        "5. Button 2 of 3",IDC_RADIO2,"Button",
                  BS_AUTORADIOBUTTON | WS_TABSTOP,17,85,58,10
  CONTROL        "6. Button 3 of 3",IDC_RADIO3,"Button",
                  BS_AUTORADIOBUTTON | WS_TABSTOP,17,104,58,10
  CONTROL        "7. Standalone button",IDC_STANDALONE,"Button",
                  BS_AUTORADIOBUTTON | WS_GROUP |WS_TABSTOP,7,136,124,10
  CONTROL        "8. Check box",IDC_CHECKBOX,"Button",BS_AUTOCHECKBOX |
                  WS_TABSTOP,7,158,124,10
  LTEXT          "9. Combo box (uneditable):",IDC_COMBOLABEL1,7,179,124,8
  COMBOBOX       IDC_COMBONOEDIT,7,191,124,25,CBS_DROPDOWNLIST |
                  CBS_SORT | WS_VSCROLL | WS_TABSTOP
  LTEXT          "10. Combo box (editable):",IDC_COMBOLABEL2,7,213,124,8
  COMBOBOX       IDC_COMBOEDIT,7,224,124,16,CBS_DROPDOWN | CBS_SORT |
                  WS_VSCROLL | WS_TABSTOP
  LTEXT          "11. Text field:",IDC_TEXTFIELD1,7,242,124,8
  EDITTEXT       IDC_TEXTFIELD,7,254,124,14,ES_AUTOHSCROLL
  LTEXT          "12. Text area:",IDC_TEXTAREALABEL,145,7,107,8
  EDITTEXT       IDC_TEXTAREA,145,19,114,26,ES_MULTILINE |
                  ES_AUTOHSCROLL
  PUSHBUTTON     "13. Button with custom handler",
                  IDC_CUSTOMBUTTON,145,54,114,14
  LTEXT          "14. List:",IDC_LISTLABEL,145,77,107,8
  LISTBOX        IDC_LIST,145,88,114,30,LBS_SORT | LBS_NOINTEGRALHEIGHT
                  | WS_VSCROLL | WS_TABSTOP
```

FIG. 4A  Prior Art

Windows Resource Script (continued)

```
LTEXT        "15. Table:",IDC_TABLELABEL,145,129,107,8
CONTROL      "List2",IDC_TABLE,"SysListView32",LVS_REPORT | WS_BORDER
             | WS_TABSTOP,145,142,114,51
CONTROL      "Slider1",IDC_SLIDER1,"msctls_trackbar32",TBS_BOTH |
             WS_TABSTOP,145,219,114,19
LTEXT        "16. Slider:",IDC_STATIC,145,206,107,8
LTEXT        "17. Progress bar:",IDC_PROGRESSLABEL,145,241,107,8
CONTROL      "Progress1",IDC_PROGRESS1,"msctls_progress32",WS_BORDER,
             145,254,114,11
LTEXT        "18. Tree:",IDC_TREELABEL,270,7,101,8
CONTROL      "Tree1",IDC_TREE,"SysTreeView32",TVS_HASBUTTONS |
             TVS_HASLINES | TVS_LINESATROOT | WS_BORDER | WS_TABSTOP,
             270,19,113,51
GROUPBOX     "Dependency testing: ",IDC_DEPENDENCYBOX,270,79,113,189
CONTROL      "Disable all",IDC_DISABLEALL,"Button",
             BS_AUTORADIOBUTTON | WS_TABSTOP,277,91,51,10
CONTROL      "Disable 3-6",IDC_DISABLE36,"Button",
             BS_AUTORADIOBUTTON | WS_GROUP | WS_TABSTOP,287,131,48,10
CONTROL      "Enable 3-6",IDC_ENABLE36,"Button",BS_AUTORADIOBUTTON
             | WS_GROUP | WS_TABSTOP,287,144,48,10
GROUPBOX     "Enable/Disable",IDC_DISABLEGROUP,276,120,73,38
PUSHBUTTON   "Select list item to enable",IDC_LISTENABLE,276,168,97,14,
             WS_DISABLED
PUSHBUTTON   "Select table item to enable",IDC_TABLEENABLE,276,187,
             97, 14, WS_DISABLED
COMBOBOX     IDC_COMBODISABLE,276,211,97,15,CBS_DROPDOWNLIST |
             CBS_SORT | WS_VSCROLL | WS_TABSTOP
CONTROL      "Remove all",IDC_REMOVEALL1,"Button",BS_AUTOCHECKBOX
             | WS_TABSTOP,277,105,51,10
LTEXT        "The following aren't supported and should never be enabled:",
             IDC_UNSUPPORTEDLABEL,276,227,97,16
LTEXT        "Unsupported:",IDC_UNSUPPORTEDTEXT,279,250,42,8,
             WS_DISABLED
EDITTEXT     IDC_UNSUPPORTEDFIELD,328,247,47,14,ES_AUTOHSCROLL |
             WS_DISABLED
END
```

FIG. 4B    Prior Art

Output

| | |
|---|---|
| Print device: | Use printer assigned to workstation ▼ |
| Output queue: | Use queue assigned to workstation ▼ |
| Library: | Library list ▼ |
| Message queue: | Use user name ▼ |
| Library: | Library list ▼ |
| Message delivery: | Use printer assigned to workstation ▼ |
| Message severity level: | 10 |

Ausgabe

Druckeinheit: Drucker verwenden, der Datenstation zugeordnet ist

Ausgabewarteschlange: Warteschlange verwenden, die Datenstation zugeordnet ist

Bibliothek: Bibliotheksliste

Nachrichtenwarteschlange: Benutzernamen verwenden

Bibliothek: Bibliotheksliste

Nachrichtenübermittlung: Benutzer benachrichtigen

Nachrichtenwertigkeit: 10

FIG. 6  *Prior Art*

```
<!--================================================================-->
<!-- XML Document Type Definition for the Panel Definition Markup Language -->
<!--================================================================-->

<!-- Declare the child elements that contain only data -->

<!ELEMENT BASESCREENSIZE    (#PCDATA)>
<!ELEMENT LOCATION          (#PCDATA)>
<!ELEMENT SIZE              (#PCDATA)>
<!ELEMENT DATACLASS(#PCDATA)>
<!ELEMENT ATTRIBUTE         (#PCDATA)>
<!ELEMENT ICON              (#PCDATA)>
<!ELEMENT ACTIVATE          (#PCDATA)>
<!ELEMENT FORMAT            (#PCDATA)>
<!ELEMENT SHORT             EMPTY>
<!ATTLIST  SHORT
        minvalue    CDATA    #IMPLIED
        maxvalue    CDATA    #IMPLIED>
<!ELEMENT INTEGER EMPTY>
<!ATTLIST  INTEGER
        minvalue    CDATA    #IMPLIED
        maxvalue    CDATA    #IMPLIED>
<!ELEMENT LONG EMPTY>
<!ATTLIST  LONG
        minvalue    CDATA    #IMPLIED
        maxvalue    CDATA    #IMPLIED>
<!ELEMENT FLOAT EMPTY>
<!ATTLIST  FLOAT
        minvalue    CDATA    #IMPLIED
        maxvalue    CDATA    #IMPLIED>
<!ELEMENT STRING EMPTY>
<!ATTLIST  STRING
        minlength   CDATA    #IMPLIED
        maxlength   CDATA    #IMPLIED>
<!ELEMENT ACTION            (#PCDATA)>
<!ELEMENT DOUBLECLICK       (#PCDATA)>
<!ELEMENT TITLE             (#PCDATA)>
<!ELEMENT STYLE             (#PCDATA)>
<!ELEMENT DEFAULTWIDTH      (#PCDATA)>
<!ELEMENT MINVALUE          (#PCDATA)>
<!ELEMENT MAXVALUE          (#PCDATA)>
<!ELEMENT MAJORTICKS        (#PCDATA)>
<!ELEMENT MINORTICKS        (#PCDATA)>
<!ELEMENT ADJUST            (#PCDATA)>
<!ELEMENT ENABLE            (#PCDATA)>
<!ELEMENT DISABLE           (#PCDATA)>
<!ELEMENT REFRESH           (#PCDATA)>
<!ELEMENT SHOW              (#PCDATA)>
```

FIG. 8A

XML Document Type Definition (continued)

```
<!ELEMENT HIDE            (#PCDATA)>
<!ELEMENT DISPLAY         (#PCDATA)>
<!ELEMENT STEP            (#PCDATA)>
<!ELEMENT PAGE            EMPTY>
<!ATTLIST  PAGE
        resource    CDATA    #REQUIRED
        name        CDATA    #REQUIRED
        stepindex   CDATA    #IMPLIED>
<!ELEMENT PANE            EMPTY>
<!ATTLIST  PANE
        resource    CDATA    #REQUIRED
        name        CDATA    #REQUIRED
        type        CDATA    #REQUIRED>
<!ELEMENT MANAGERCLASS   (#PCDATA)>
<!ELEMENT FLYOVER         (#PCDATA)>
<!ELEMENT HELPALIAS       (#PCDATA)>

<!--================================================================ -->

<!-- Declare the child elements that are contained by other child elements -->

<!ELEMENT SELECTED        (ENABLE|DISABLE|REFRESH|SHOW|HIDE|
                           DISPLAY)+>
<!ELEMENT DESELECTED      (ENABLE|DISABLE|REFRESH|SHOW|HIDE|
                           DISPLAY)+>
<!ELEMENTCHOICE           (TITLE,(ENABLE|DISABLE|REFRESH|SHOW|
                           HIDE|DISPLAY)*)>
<!ATTLIST  CHOICE
        name        CDATA    #REQUIRED>
<!ELEMENT ITEM            (TITLE,(ENABLE|DISABLE|REFRESH|SHOW|
                           HIDE|DISPLAY)*)>
<!ATTLIST  ITEM
        name        CDATA    #REQUIRED>
<!ELEMENT COLUMN          (TITLE,DEFAULTWIDTH?,(DATACLASS,
                           ATTRIBUTE)?,ITEM*)>
<!ATTLIST  COLUMN
        primary     CDATA    "no"
        editable    CDATA    "no">
<!ELEMENT NODE      (TITLE,ICON?,(ENABLE|DISABLE|REFRESH|SHOW|
                     HIDE|DISPLAY)*,NODE*)>
<!ATTLIST  NODE
        name        CDATA    #REQUIRED>
<!ELEMENT ROOT      (TITLE,ICON?,(ENABLE|DISABLE|REFRESH|SHOW|
                     HIDE|DISPLAY)*,NODE*)>
<!ATTLIST  ROOT
        name        CDATA    #REQUIRED>
```

FIG. 8B

XML Document Type Definition (continued)

<!-- Declare the UI components -->

```
<!ELEMENT LABEL      (TITLE,LOCATION,SIZE,FLYOVER?,HELPALIAS?)>
<!ATTLIST  LABEL
       name       CDATA      #REQUIRED
       disabled   CDATA      "no">
<!ELEMENT IMAGE      (TITLE,LOCATION,SIZE?,FLYOVER?)>
<!ATTLIST  IMAGE
       name CDATA      #REQUIRED>
<!ELEMENT CUSTOM     (LOCATION,SIZE,MANAGERCLASS)>
<!ATTLIST  CUSTOM
       name CDATA      #REQUIRED>
<!ELEMENT BUTTON     (TITLE,LOCATION,SIZE,STYLE?,ACTION?,FLYOVER?,
                      HELPALIAS?)>
<!ATTLIST  BUTTON
       name       CDATA      #REQUIRED
       disabled   CDATA      "no">
<!ELEMENT GROUPBOX (TITLE,LOCATION,SIZE,HELPALIAS?)>
<!ATTLIST  GROUPBOX
       name CDATA      #REQUIRED>
<!ELEMENT RADIOBUTTON    (TITLE,LOCATION,SIZE,(DATACLASS,
                          ATTRIBUTE)?,SELECTED?,DESELECTED?,
                          FLYOVER?,HELPALIAS?)>
<!ATTLIST  RADIOBUTTON
       name       CDATA      #REQUIRED
       disabled   CDATA      "no">
<!ELEMENT CHECKBOX (TITLE,LOCATION,SIZE,(DATACLASS,ATTRIBUTE)?,
                    SELECTED?,DESELECTED?,FLYOVER?,HELPALIAS?)>
<!ATTLIST  CHECKBOX
       name       CDATA      #REQUIRED
       disabled   CDATA      "no">
<!ELEMENT BUTTONGROUP    ((DATACLASS,ATTRIBUTE)?,(RADIOBUTTON|
                          CHECKBOX)+)>
<!ATTLIST  BUTTONGROUP
       name       CDATA      #REQUIRED
       disabled   CDATA      "no">
<!ELEMENT COMBOBOX(TITLE?,LOCATION,SIZE,(DATACLASS,
                   ATTRIBUTE)?,CHOICE*,(SHORT?|INTEGER?|LONG?|
                   FLOAT?|STRING?|FORMAT?),FLYOVER?,
                   HELP ALIAS?)>
<!ATTLIST  COMBOBOX
       name       CDATA      #REQUIRED
       editable   CDATA      "no"
       disabled   CDATA      "no">
```

FIG. 8C

XML Document Type Definition (continued)

```
<!ELEMENT TEXTFIELD  (TITLE?,LOCATION,SIZE,(DATACLASS,ATTRIBUTE)?,
                     (SHORT?|INTEGER?|LONG?|FLOAT?|STRING?|
                     FORMAT?),FLYOVER?,HELPALIAS?)>
<!ATTLIST  TEXTFIELD
       name        CDATA      #REQUIRED
       masked      CDATA      "no"
       disabled    CDATA      "no">
<!ELEMENT TEXTAREA   (TITLE?,LOCATION,SIZE,(DATACLASS,ATTRIBUTE)?,
                     (SHORT?|INTEGER?|LONG?|FLOAT?|STRING?|
                     FORMAT?),FLYOVER?,HELPALIAS?)>
<!ATTLIST  TEXTAREA
       name        CDATA      #REQUIRED
       disabled    CDATA      "no">
<!ELEMENT SLIDER     (LOCATION,SIZE,(DATACLASS,ATTRIBUTE)?,
                     MINVALUE,MAXVALUE,(MAJORTICKS,MINORTICKS)?
                     ,ADJUST?,FLYOVER?,HELPALIAS?)>
<!ATTLIST  SLIDER
       name         CDATA     #REQUIRED
       orientation  CDATA     "horizontal"
       disabled     CDATA     "no">
<!ELEMENT PROGRESSBAR   (LOCATION,SIZE,MINVALUE,MAXVALUE,
                        FLYOVER?,HELPALIAS?)>
<!ATTLIST  PROGRESSBAR
       name CDATA      #REQUIRED>
<!ELEMENT LIST  (LOCATION,SIZE,(DATACLASS,ATTRIBUTE)?,ITEM*,
                SELECTED?,DESELECTED?,DOUBLECLICK?,FLYOVER?,
                HELPALIAS?)>
<!ATTLIST  LIST
       name         CDATA     #REQUIRED
       selection    CDATA     "single"
       disabled     CDATA     "no">
<!ELEMENT TABLE      (LOCATION,SIZE,COLUMN+,SELECTED?,
                     DESELECTED?,DOUBLECLICK?,FLYOVER?,
                     HELPALIAS?)>
<!ATTLIST  TABLE
       name         CDATA     #REQUIRED
       selection    CDATA     "single"
       disabled     CDATA     "no">
<!ELEMENT TREE (LOCATION,SIZE,(DATACLASS,ATTRIBUTE)?,ROOT?,
               DOUBLECL ICK?,FLYOVER?,HELPALIAS?)>
<!ATTLIST  TREE
       name         CDATA     #REQUIRED
       disabled     CDATA     "no">
<!--=============================================================== -->
```

FIG. 8D

XML Document Type Definition (continued)

```
<!-- Declare PANEL -->
<!ELEMENT PANEL      (TITLE,SIZE,ICON?,ACTIVATE?,(LABEL|IMAGE|
                      CUSTOM|BUTTON|GROUPBOX|RADIOBUTTON|
                      BUTTONGROUP|CHECKBOX|COMBOBOX|TEXTFIELD
                      |TEXTAREA|SLIDER|PROGRESSBAR|LIST|TABLE|
                      TREE|SPLITPANE|DECKPANE| TABBEDPANE)*)>
<!ATTLIST   PANEL
         name CDATA    #REQUIRED>

<!-- Declare PROPERTYSHEET -->
<!ELEMENT PROPERTYSHEET (TITLE?,ICON?,PAGE+)>
<!ATTLIST   PROPERTYSHEET
         name CDATA    #REQUIRED>

<!-- Declare WIZARD -->
<!ELEMENT WIZARD     (ICON?,STEP*,PAGE+)>
<!ATTLIST   WIZARD
         name CDATA    #REQUIRED>

<!-- Declare SPLITPANE -->
<!ELEMENT SPLITPANE  (TITLE?,LOCATION?,SIZE?,PANE+)>
<!ATTLIST   SPLITPANE
         name         CDATA    #REQUIRED
         orientation  CDATA    "horizontal">

<!-- Declare DECKPANE -->
<!ELEMENT DECKPANE   (TITLE?,LOCATION?,SIZE?,PANE+)>
<!ATTLIST   DECKPANE
         name CDATA    #REQUIRED>

<!-- Declare TABBEDPANE -->
<!ELEMENT TABBEDPANE (TITLE?,LOCATION?,SIZE?,PANE+)>
<!ATTLIST   TABBEDPANE
         name      CDATA    #REQUIRED
         placement CDATA    "top">

<!-- Declare PDML -->
<!ELEMENT PDML ((PANEL|PROPERTYSHEET|WIZARD|SPLITPANE|DECKPANE
               |TABBEDPANE)*)>
<!ATTLIST   PDML
         version        CDATA    #REQUIRED
         source         CDATA    #REQUIRED
         basescreensize CDATA    #IMPLIED>

PDML GRAPHICAL COMPONENTS

PANEL
LABEL
IMAGE
CUSTOM
BUTTON
GROUPBOX
RADIOBUTTON
CHECKBOX
BUTTONGROUP
COMBOBOX
TEXTFIELD
TEXTAREA
SLIDER
PROGRESSBAR
LIST
TABLE
TREE
SPLITPANE
DECKPANE
TABBEDPANE

FIG. 9

PDML Panel Definition

```
1210  <PDML version="1.0" source="WINDOWS" basescreensize="1280x1024">

1220      <PANEL name="IDD_SUPPORTED_COMPONENTS">
1230          <TITLE>IDD_SUPPORTED_COMPONENTS</TITLE>
1240          <SIZE>400,300</SIZE>
              <BUTTON name="IDOK">
                  <TITLE>IDOK</TITLE>
                  <LOCATION>109,279</LOCATION>
                  <SIZE>50,14</SIZE>
                  <STYLE>DEFAULT</STYLE>
              </BUTTON>
              <BUTTON name="IDCANCEL">
                  <TITLE>IDCANCEL</TITLE>
                  <LOCATION>175,279</LOCATION>
                  <SIZE>50,14</SIZE>
              </BUTTON>
              <BUTTON name="IDHELP">
                  <TITLE>IDHELP</TITLE>
                  <LOCATION>241,279</LOCATION>
                  <SIZE>50,14</SIZE>
              </BUTTON>
              <LABEL name="IDC_LABEL">
                  <TITLE>IDC_LABEL</TITLE>
                  <LOCATION>7,7</LOCATION>
                  <SIZE>124,8</SIZE>
              </LABEL>
              <LABEL name="IDC_MULTILINE">
                  <TITLE>IDC_MULTILINE</TITLE>
                  <LOCATION>7,25</LOCATION>
                  <SIZE>124,17</SIZE>
              </LABEL>
              <GROUPBOX name="IDC_GROUPBOX">
                  <TITLE>IDC_GROUPBOX</TITLE>
                  <LOCATION>7,51</LOCATION>
                  <SIZE>124,73</SIZE>
              </GROUPBOX>
              <RADIOBUTTON name="IDC_RADIO1">
                  <TITLE>IDC_RADIO1</TITLE>
                  <LOCATION>17,66</LOCATION>
                  <SIZE>58,10</SIZE>
              </RADIOBUTTON>
              <RADIOBUTTON name="IDC_RADIO2">
                  <TITLE>IDC_RADIO2</TITLE>
                  <LOCATION>17,85</LOCATION>
                  <SIZE>58,10</SIZE>
              </RADIOBUTTON>
```

FIG. 12A

PDML Panel Definition (continued)

```
<RADIOBUTTON name="IDC_RADIO3">
    <TITLE>IDC_RADIO3</TITLE>
    <LOCATION>17,104</LOCATION>
    <SIZE>58,10</SIZE>
</RADIOBUTTON>
<BUTTONGROUP name="IDC_STANDALONE_group">
    <RADIOBUTTON name="IDC_STANDALONE">
        <TITLE>IDC_STANDALONE</TITLE>
        <LOCATION>7,136</LOCATION>
        <SIZE>124,10</SIZE>
    </RADIOBUTTON>
</BUTTONGROUP>
<CHECKBOX name="IDC_CHECKBOX">
    <TITLE>IDC_CHECKBOX</TITLE>
    <LOCATION>7,158</LOCATION>
    <SIZE>124,10</SIZE>
</CHECKBOX>
<LABEL name="IDC_COMBOLABEL1">
    <TITLE>IDC_COMBOLABEL1</TITLE>
    <LOCATION>7,179</LOCATION>
    <SIZE>124,8</SIZE>
</LABEL>
<COMBOBOX name="IDC_COMBONOEDIT" editable="no">
    <LOCATION>7,191</LOCATION>
    <SIZE>124,12</SIZE>
</COMBOBOX>
<LABEL name="IDC_COMBOLABEL2">
    <TITLE>IDC_COMBOLABEL2</TITLE>
    <LOCATION>7,213</LOCATION>
    <SIZE>124,8</SIZE>
</LABEL>
<COMBOBOX name="IDC_COMBOEDIT" editable="yes">
    <LOCATION>7,224</LOCATION>
    <SIZE>124,12</SIZE>
</COMBOBOX>
<LABEL name="IDC_TEXTFIELD1">
    <TITLE>IDC_TEXTFIELD1</TITLE>
    <LOCATION>7,242</LOCATION>
    <SIZE>124,8</SIZE>
</LABEL>
<TEXTFIELD name="IDC_TEXTFIELD" masked="no">
    <LOCATION>7,254</LOCATION>
    <SIZE>124,14</SIZE>
</TEXTFIELD>
<LABEL name="IDC_TEXTAREALABEL">
    <TITLE>IDC_TEXTAREALABEL</TITLE>
    <LOCATION>145,7</LOCATION>
    <SIZE>107,8</SIZE>
</LABEL>
```

FIG. 12B

PDML Panel Definition (continued)

```xml
<TEXTAREA name="IDC_TEXTAREA">
    <LOCATION>145,19</LOCATION>
    <SIZE>114,26</SIZE>
</TEXTAREA>
<BUTTON name="IDC_CUSTOMBUTTON">
    <TITLE>IDC_CUSTOMBUTTON</TITLE>
    <LOCATION>145,54</LOCATION>
    <SIZE>114,14</SIZE>
</BUTTON>
<LABEL name="IDC_LISTLABEL">
    <TITLE>IDC_LISTLABEL</TITLE>
    <LOCATION>145,77</LOCATION>
    <SIZE>107,8</SIZE>
</LABEL>
<LIST name="IDC_LIST" selection="single">
    <LOCATION>145,88</LOCATION>
    <SIZE>114,30</SIZE>
</LIST>
<LABEL name="IDC_TABLELABEL">
    <TITLE>IDC_TABLELABEL</TITLE>
    <LOCATION>145,129</LOCATION>
    <SIZE>107,8</SIZE>
</LABEL>
<TABLE name="IDC_TABLE" selection="multiinterval">
    <LOCATION>145,142</LOCATION>
    <SIZE>114,51</SIZE>
    <COLUMN primary="yes" editable="no">
        <TITLE>IDC_TABLE@COLUMN_1</TITLE>
    </COLUMN>
</TABLE>
<SLIDER name="IDC_SLIDER1" orientation="horizontal">
    <LOCATION>145,219</LOCATION>
    <SIZE>114,19</SIZE>
    <MINVALUE>0</MINVALUE>
    <MAXVALUE>10</MAXVALUE>
</SLIDER>
<LABEL name="IDC_STATIC">
    <TITLE>IDC_STATIC</TITLE>
    <LOCATION>145,206</LOCATION>
    <SIZE>107,8</SIZE>
</LABEL>
<LABEL name="IDC_PROGRESSLABEL">
    <TITLE>IDC_PROGRESSLABEL</TITLE>
    <LOCATION>145,241</LOCATION>
    <SIZE>107,8</SIZE>
</LABEL>
```

FIG. 12C

PDML Panel Definition (continued)

```
<PROGRESSBAR name="IDC_PROGRESS1">
    <LOCATION>145,254</LOCATION>
    <SIZE>114,11</SIZE>
    <MINVALUE>0</MINVALUE>
    <MAXVALUE>10</MAXVALUE>
</PROGRESSBAR>
<LABEL name="IDC_TREELABEL">
    <TITLE>IDC_TREELABEL</TITLE>
    <LOCATION>270,7</LOCATION>
    <SIZE>101,8</SIZE>
</LABEL>
<TREE name="IDC_TREE">
    <LOCATION>270,19</LOCATION>
    <SIZE>113,51</SIZE>
</TREE>
<GROUPBOX name="IDC_DEPENDENCYBOX">
    <TITLE>IDC_DEPENDENCYBOX</TITLE>
    <LOCATION>270,79</LOCATION>
    <SIZE>113,189</SIZE>
</GROUPBOX>
<CHECKBOX name="IDC_DISABLEALL">
    <TITLE>IDC_DISABLEALL</TITLE>
    <LOCATION>277,91</LOCATION>
    <SIZE>51,10</SIZE>
</CHECKBOX>
<BUTTONGROUP name="IDC_DISABLE36_group">
    <RADIOBUTTON name="IDC_DISABLE36">
        <TITLE>IDC_DISABLE36</TITLE>
        <LOCATION>287,131</LOCATION>
        <SIZE>48,10</SIZE>
    </RADIOBUTTON>
</BUTTONGROUP>
<BUTTONGROUP name="IDC_ENABLE36_group">
    <RADIOBUTTON name="IDC_ENABLE36">
        <TITLE>IDC_ENABLE36</TITLE>
        <LOCATION>287,144</LOCATION>
        <SIZE>48,10</SIZE>
    </RADIOBUTTON>
</BUTTONGROUP>
<GROUPBOX name="IDC_DISABLEGROUP">
    <TITLE>IDC_DISABLEGROUP</TITLE>
    <LOCATION>276,120</LOCATION>
    <SIZE>73,38</SIZE>
</GROUPBOX>
<BUTTON name="IDC_LISTENABLE">
    <TITLE>IDC_LISTENABLE</TITLE>
    <LOCATION>276,168</LOCATION>
    <SIZE>97,14</SIZE>
</BUTTON>
```

FIG. 12D

PDML Panel Definition (continued)

```
<BUTTON name="IDC_TABLEENABLE">
    <TITLE>IDC_TABLEENABLE</TITLE>
    <LOCATION>276,187</LOCATION>
    <SIZE>97,14</SIZE>
</BUTTON>
<COMBOBOX name="IDC_COMBODISABLE" editable="no">
    <LOCATION>276,211</LOCATION>
    <SIZE>97,12</SIZE>
</COMBOBOX>
<CHECKBOX name="IDC_REMOVEALL1">
    <TITLE>IDC_REMOVEALL1</TITLE>
    <LOCATION>277,105</LOCATION>
    <SIZE>51,10</SIZE>
</CHECKBOX>
<LABEL name="IDC_UNSUPPORTEDLABEL">
    <TITLE>IDC_UNSUPPORTEDLABEL</TITLE>
    <LOCATION>276,227</LOCATION>
    <SIZE>97,16</SIZE>
</LABEL>
<LABEL name="IDC_UNSUPPORTEDTEXT">
    <TITLE>IDC_UNSUPPORTEDTEXT</TITLE>
    <LOCATION>279,250</LOCATION>
    <SIZE>42,8</SIZE>
</LABEL>
<TEXTFIELD name="IDC_UNSUPPORTEDFIELD" masked="no">
    <LOCATION>328,247</LOCATION>
    <SIZE>47,14</SIZE>
</TEXTFIELD>
</PANEL>
</PDML>
```

FIG. 12E

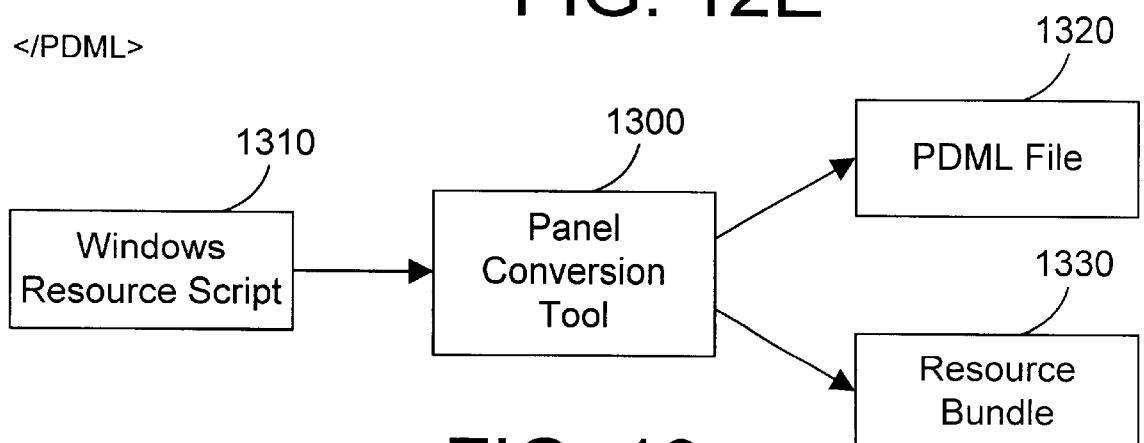

FIG. 13

SPECIFICATION LANGUAGE FOR DEFINING USER INTERFACE PANELS THAT ARE PLATFORM-INDEPENDENT

REFERENCE TO MICROFICHE APPENDIX

A single microfiche appendix that contains a total of 43 frames is included with this patent application.

BACKGROUND OF THE INVENTION

1. Technical Field

This invention generally relates to computer system displays and more specifically relates to a mechanism and method for defining and displaying user interface panels that are platform-independent.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Early computer systems used command-based operating systems and software applications. These command-based systems provided a user interface that required the user to memorize a relatively large number of commands in order to perform meaningful work. The user interfaces for these command-driven computer programs required a relatively high level of skill to operate, and were not considered to be "user-friendly." With the introduction of the IBM personal computer (PC), computers became more widely available, both in the workplace and in homes, and the computer industry soon recognized the need to provide more user-friendly interfaces to computer programs. As a result, many different operating systems were introduced that provided a graphical user interface (GUI), including IBM's OS/2, Microsoft Windows, and the Apple McIntosh. Software applications with graphical user interfaces soon followed, and the vast majority of computer programs running on personal computers today provides a user-friendly graphical user interface.

Most graphical user interfaces provide many common features. The basic display area in a graphical user interface is known as a window or panel. For the discussion in this patent application, we refer to a basic display area as a panel, recognizing that other terms are known in the art to describe display areas. A single panel may fill the entire display, or the display can be split into a number of different panels. A panel may include a number of different "components", which are different areas that display text, drop-down lists, text entry fields, etc. A pointing device such as a trackball or a mouse is generally used to select various commands and options on a panel by clicking on the appropriate fields or buttons within the panel. In addition, a keyboard is commonly used to enter text information into a panel.

Various methods have been developed for generating panels. For example, an editor provided with Microsoft Visual C++ provides a graphical tool that allows a programmer to define a panel that may be displayed using Microsoft Windows by selecting and dropping desired components onto the panel. When the programmer is finished, the panel is defined as a Windows resource script (.rc file). Resource script is a special programming language that allows a user to define the appearance and function of a panel. Of course, when a programmer uses a graphical tool to generate a panel, the tool translates the components the programmer sees on the panel into a corresponding resource script without the programmer directly writing code in resource script format. An example of a panel defined in Windows resource script is shown in FIG. 3, with the corresponding resource script shown in FIGS. 4A and 4B.

While generating panels using Visual C++ is relatively straightforward, the resulting panels in resource script format can only be displayed on a Microsoft Windows platform. Today, there is a great push to provide software applications that are "platform-independent", which means that a software application may run on computer systems that have different operating systems, such as OS/2, Windows, AIX, AS/400, etc. The Java programming language developed by Sun Microsystems provides a programming language for platform-independent software applications.

The Java programming language currently has some graphical tools for generating panels in Java, such as Symantec Visual Cafe. These graphical tools generate Java code, and define sizes and positions of user interface components in absolute pixel coordinates. However, the preferred method of generating user interface panels in Java uses Java-defined classes known as layout managers. Java allows a programmer to select an appropriate layout manager class depending on the type of panel that the programmer wants to display and then add appropriate components to the panel. The layout manager will then work out how the components are displayed in the panel. It is often necessary to use different layout managers for different sections of a panel, imposing upon the programmer the burden and complexity of dealing with multiple layout managers.

Typically, the functional components are distinguished from mere text or other display information that is simply displayed to a user. The text or other display information is typically stored in a resource bundle separate from the Java functional components. Thus, a panel with English text will have a corresponding English resource bundle, while the same panel could be displayed in German using a German resource bundle instead of the English resource bundle. An example of a user interface panel that was generated in Java and that uses an English resource bundle is shown in FIG. 5.

In Java, the programmer has no direct control of location of components within the panel. The logic behind the layout managers is to allow an application to be ported to a different language quickly and easily. Thus, if the text on a button is twice as long in German than it is in English, the layout manager has the intelligence to stretch the button to accommodate the longer German label (stored in the German resource bundle) on the button. The panel of FIG. 6 is a German version of the panel of FIG. 5. However, defining user interface panels in Java has significant drawbacks. The programmer has no precise control over the appearance of components on a panel, but must instead rely on a Java layout manager to determine the size and position of components on the panel. In addition, using the layout managers in Java to generate a user interface panel requires that the programmer is skilled in the Java programming language. Thus, the generation and modification of user interface panels must be performed by a skilled Java programmer.

This is in stark contrast to the Windows environment, where a person can design a platform-specific user interface panel using a graphical editor, having no specialized programming knowledge. Even using the graphical editors for Java panels, such as Symantec Visual Cafe, the result is Java code that defines sizes and positions of user interface components in absolute pixel coordinates, and that bypass the Java layout managers. This makes it difficult to port the panels to a different language, because translators must create new versions of the generated Java code for each language, and the application is obliged to provide run-time code that figures out which version of the panel should be invoked based on the language/country settings currently in effect. Without a mechanism that gives the programmer precise control over the location of components on a platform-independent panel without requiring specialized programming skills, the generation of platform-independent user interface panels will continue to be an impediment to the generation of platform-independent software.

DISCLOSURE OF INVENTION

According to the preferred embodiments, a specification language allows a user to define platform-independent user interface panels without detailed knowledge of complex computer programming languages. The specification language is referred to herein as a Panel Definition Markup Language (PDML), which defines tags that are used in similar fashion to those defined in Hypertext Markup Language (HTML), that allow a user to specify the exact location of components displayed in the panel. A graphical editor allows the creation and modification of platform-independent user interface panels without programming directly in the specification language. A conversion tool may be used to convert platform-specific user interface panels to corresponding platform-independent user interface panels. A help generator tool also facilitates the generation of context-sensitive help for a user interface panel.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIGS. 4A–4B show the Windows resource script for the panel of FIG. 3;

FIG. 6 is a display of the user interface panel of FIG. 5 when the panel is displayed in German;

FIGS. 8A–8E show an XML Document Type Definition file that defines the Panel Definition Markup Language (PDML) in accordance with the preferred embodiments;

FIG. 9 shows some of the components defined in PDML;

FIGS. 12A–12E show the PDML code for the panel of FIG. 11;

FIG. 13 is a block diagram showing the conversion of a Windows resource script file to a PDML file by the panel conversion tool of FIG. 1;

BEST MODE FOR CARRYING OUT THE INVENTION

Figure 1:
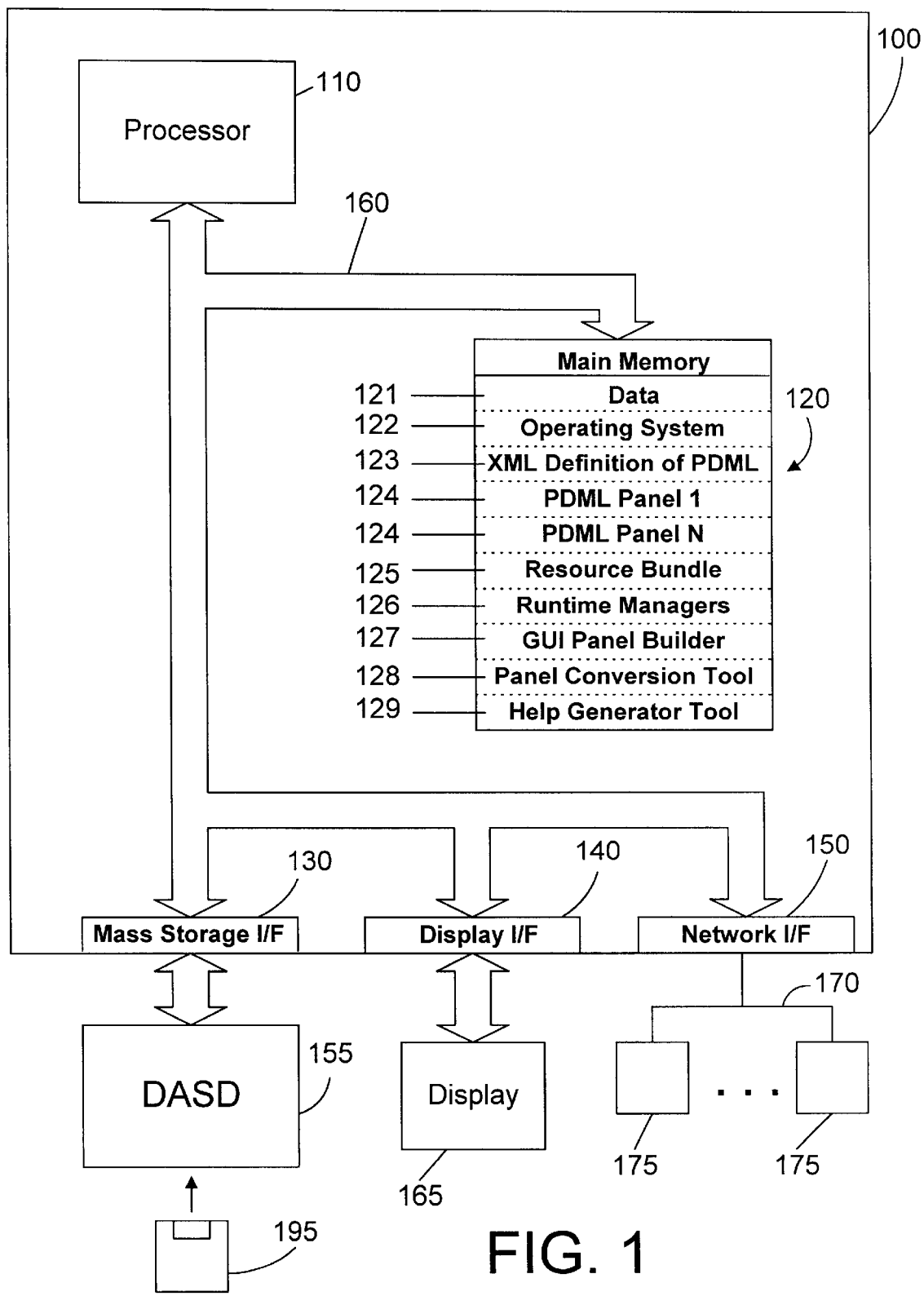
FIG. 1 is a block diagram of an apparatus in accordance with a preferred embodiment of the present invention.

The present invention is accomplished through the generation of user interface panels in a platform-independent object oriented programming language, such as Java. For those who are not familiar with object oriented programming concepts or the Java programming language, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

Java Programing Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

2. Detailed Description

According to a preferred embodiment of the present invention, a panel definition markup language (PDML) is defined in extensible markup language (XML) that provides a way to define user interface panels in a platform-independent manner while giving the programmer precise control over the placement of components on the panel. This allows a programmer to define user interface panels using a relatively simple markup language, rather than by programming in C++ or another relatively complex object oriented programming language.

Referring to FIG. 1, a computer system 100 in accordance with the preferred embodiment is an enhanced IBM RS/6000 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, an XML definition 123 of a panel definition markup language (PDML), one or more panels 124 defined in PDML, a resource bundle 125, one or more run-time managers 126, a graphical user interface (GUI) panel builder 127, a panel conversion tool 128, and a help generator tool 129. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, XML definition 123 of PDML, PDML panels 124, resource bundle 125, run-time managers 126, GUI panel builder 127, panel conversion tool 128, and help generator tool 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as AIX; however, those skilled in the art will appreciate that the spirit and scope of the present invention is not limited to any one operating system. Operating system 122 preferably supports an object oriented programming environment such as that provided, for example, by the Java programming language.

XML definition 123 of PDML is a file in extensible markup language (XML) format that defines the tags that are used in PDML. XML is a very flexible and powerful way to define a markup language. One example of a well-known markup language is hypertext markup language (HTML) that is used to display web pages on the Internet. XML defines a grammar for creating your own markup language. It provides a way to define a set of tags, similar to HTML tags, and to specify the order in which the tags may occur and what tags may enclose other tags.

XML definition 123 of PDML defines the features of PDML that allow a programmer to define a panel and components on the panel. The XML definition 123 of PDML is thus one specific example of a suitable specification language in accordance with a preferred embodiment for defining platform-independent user interface panels. XML is an evolving industry standard defined by the World Wide Web Consortium, commonly known as W3C. It is a subset of the Standard Generalized Markup Language (SGML) which is targeted for use on the Web. A copy of the XML specification dated Dec. 8, 1997 is included as a microfiche appendix. XML is platform-independent, and therefore panels that are defined using PDML, which is defined in XML, are also platform-independent.

An XML document may be parsed, or dissected into its constituent parts, for use by Java applications. The W3C defines certain standards to which XML parser software must be written, and there are a number of XML parsers available for free on the world-wide web. For example, a suitable XML parser is the IBM XML For Java parser which is available from IBM's Yamato research lab.

Each PDML panel 124 is a panel that is defined by a programmer using the tags and syntax that defines the panel definition markup language (PDML). Each panel may have one or more components, as discussed in more detail below. Resource bundle 125 is a language-specific bundle of information that may be used by a panel to display its various components. For example, a resource bundle 125 may be provided in English to display text on a panel in English. A different resource bundle 125 may be provided to display the same panel in German. The resource bundle makes it relatively easy to port user interface panels to different languages.

Figure 2:
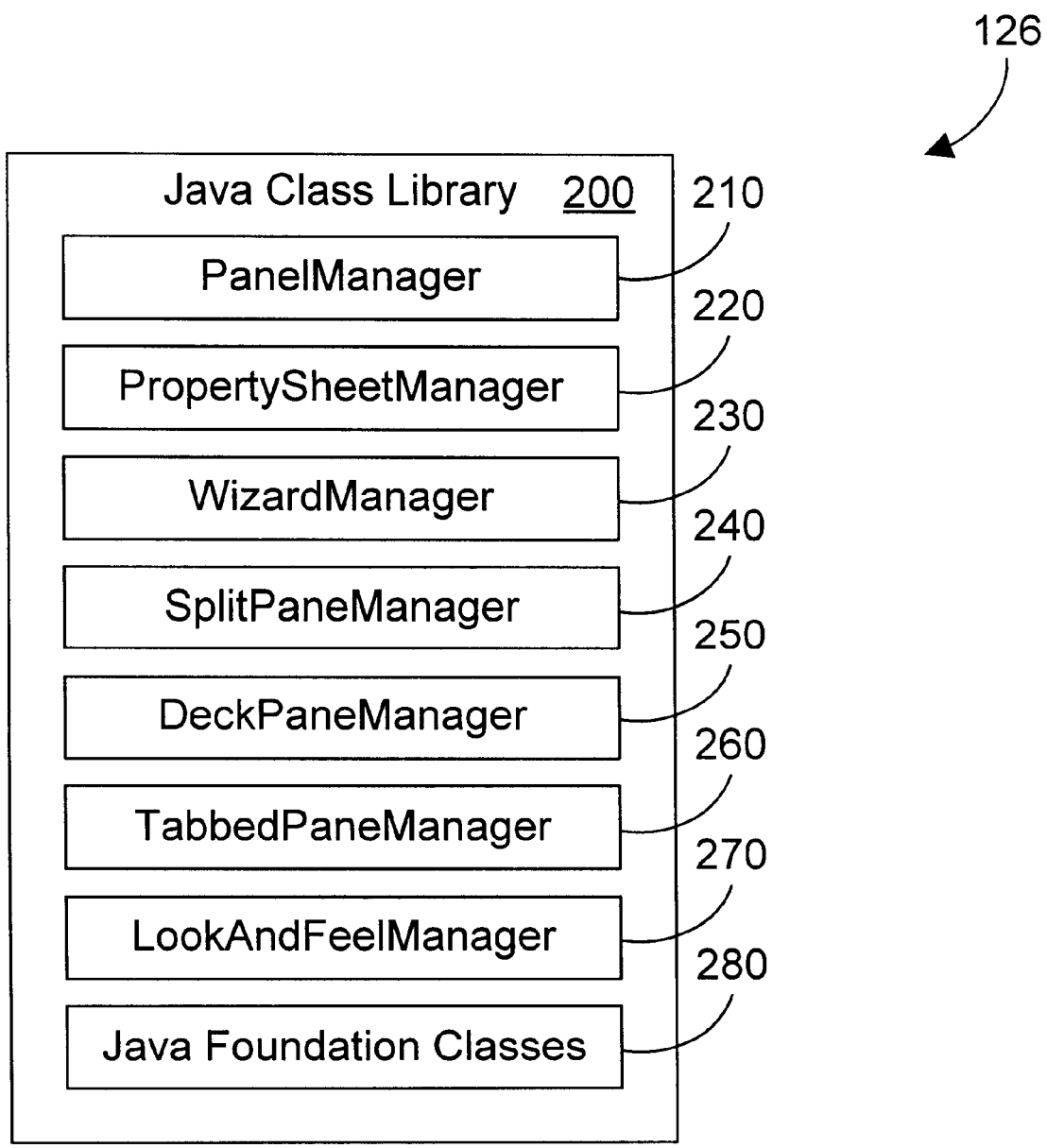
FIG. 2 is a block diagram of some of the classes that represent the run-time managers 126 of FIG. 1.

Run-time managers 126 process PDML panels 124 and resource bundles 125 to generate a displayed panel. In the preferred embodiment, run-time managers 126 are defined using a set of Java classes in a Java class library 200, as shown in FIG. 2. Java class library 200 is a collection of Java classes that are needed to support the processing and display of PDML panels 124. Java class library 200 suitably includes a panel manager class 210, a property sheet manager class 220, a wizard manager class 230, a split pane manager class 240, a deck pane manager class 250, a tabbed pane manager class 260, a look and feel manager class 270, and Java foundation classes 280. The panel manager, property sheet manager, and wizard manager are discussed in more detail below, along with a description of some of the relevant Java foundation classes 280 that are needed to process and display PDML panels.

Referring back to FIG. 1, GUI panel builder 127 is a tool that provides a graphical user interface for defining panels in PDML. In the preferred embodiment, GUI panel builder 127 is a what-you-see-is-what-you-get (WYSIWYG) editor similar to the editor in Microsoft Visual C++ that allows graphic building of panels for a Windows environment. The big difference, of course, is that the PDML panels 124 defined using GUI panel builder 127 are platform-independent. GUI panel builder 127 eliminates the need for a person that wants to define user interface panels to learn a complex object oriented programming language such as C++ or Java, and even eliminates the need for the person to learn PDML. GUI panel builder 127 provides a graphical interface and translates the graphical components automatically into PDML.

Panel conversion tool 128 allows for automatically converting a platform-specific user interface panel to an equivalent PDML representation of the panel. For example, a specific example of panel conversion tool 128 may convert Windows resource script (.rc) files to an equivalent PDML representation of the panel. Panel conversion tool 128 thus provides a programmer a very simple way to convert platform-specific panels to PDML, which is platform-independent. Needless to say, panel conversion tool 128 can greatly speed porting a platform-specific user interface panel to Java or any other platform independent representation of that panel.

Help generator tool 129 is a tool that helps a programmer generate context sensitive help for a PDML panel. Help generator tool 129 defines a "help skeleton" with headings that correspond to components on the PDML panel. A programmer can then add text or other features to the help skeleton to generate one or more help screens that corresponds to a user interface panel 124 defined in PDML.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165 are used to display information to system administrators and users. Note, however, that while display interface 140 is provided to support communication with one or more displays 165, computer system 100 does not necessarily require a local display 165, because all needed interaction with users and other processes may occur via network interface 150 to displays on remote workstations.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/ Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figures 5, 7:
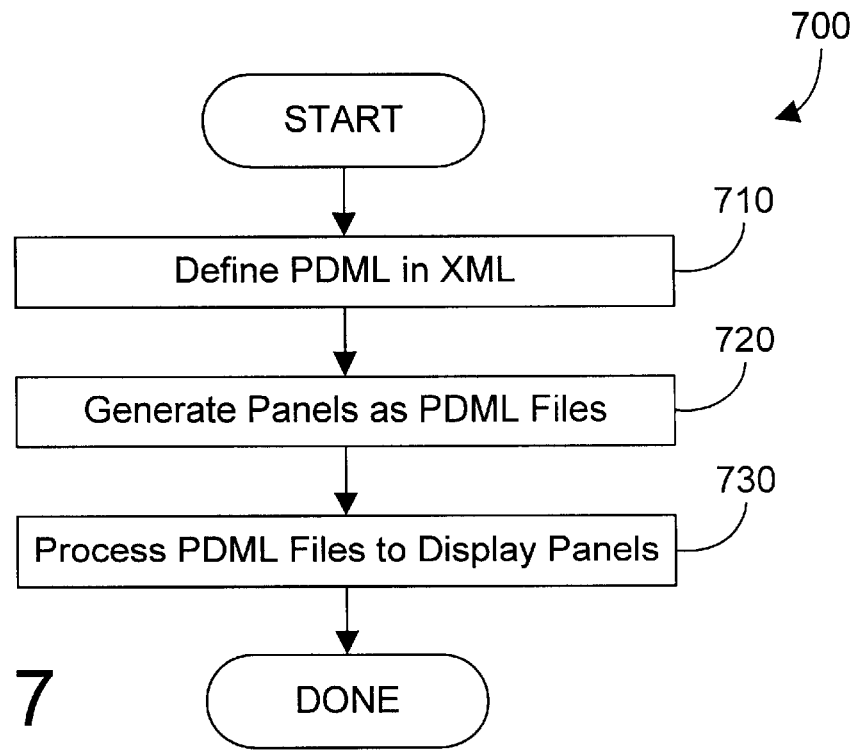
FIG. 5 is a display of a user interface panel defined using a layout manager in Java when the panel is displayed in English.
FIG. 7 is a flow diagram of a method in accordance with the preferred embodiments.

Referring now to FIG. 7, a method 700 for generating and displaying PDML panels in accordance with the preferred embodiments includes the steps of defining the PDML language using XML (step 710); generating one or more panels as files in PDML (step 720); and processing the PDML files (that correspond to panels) to display the panels to a user (step 730). The definition of PDML in XML (step 710) is performed by supplying a Document Type Definition file to XML that defines the tags and other parameters for PDML. A suitable example of a Document Type Definition file that defines PDML in accordance with a preferred embodiment is shown in FIGS. 8A–8E.

Some of the tags defined in PDML that correspond to graphical components in a panel are shown in FIG. 9. These tags are used to define a panel (using the PANEL tag), and are also used to define the components in a panel (such as label, image, button, etc.). These tags are used in a syntax that is similar to the syntax for hypertext markup language (HTML) that is commonly used to generate and display web pages. Providing tags in PDML thus provides an interface that an experienced HTML programmer will be able to learn and apply very quickly. The tags in FIG. 9 are described in more detail below.

The use of an XML-based tag language such as PDML has many benefits. Developers have precise control over the sizes and positions of user interface components. Changes to the panel layout do not require any code to be recompiled. Unique versions of a given panel may easily be created for each national language supported by an application. Translators do not need specialized skills in an object oriented programming language to modify the panel definitions.

Figure 10:
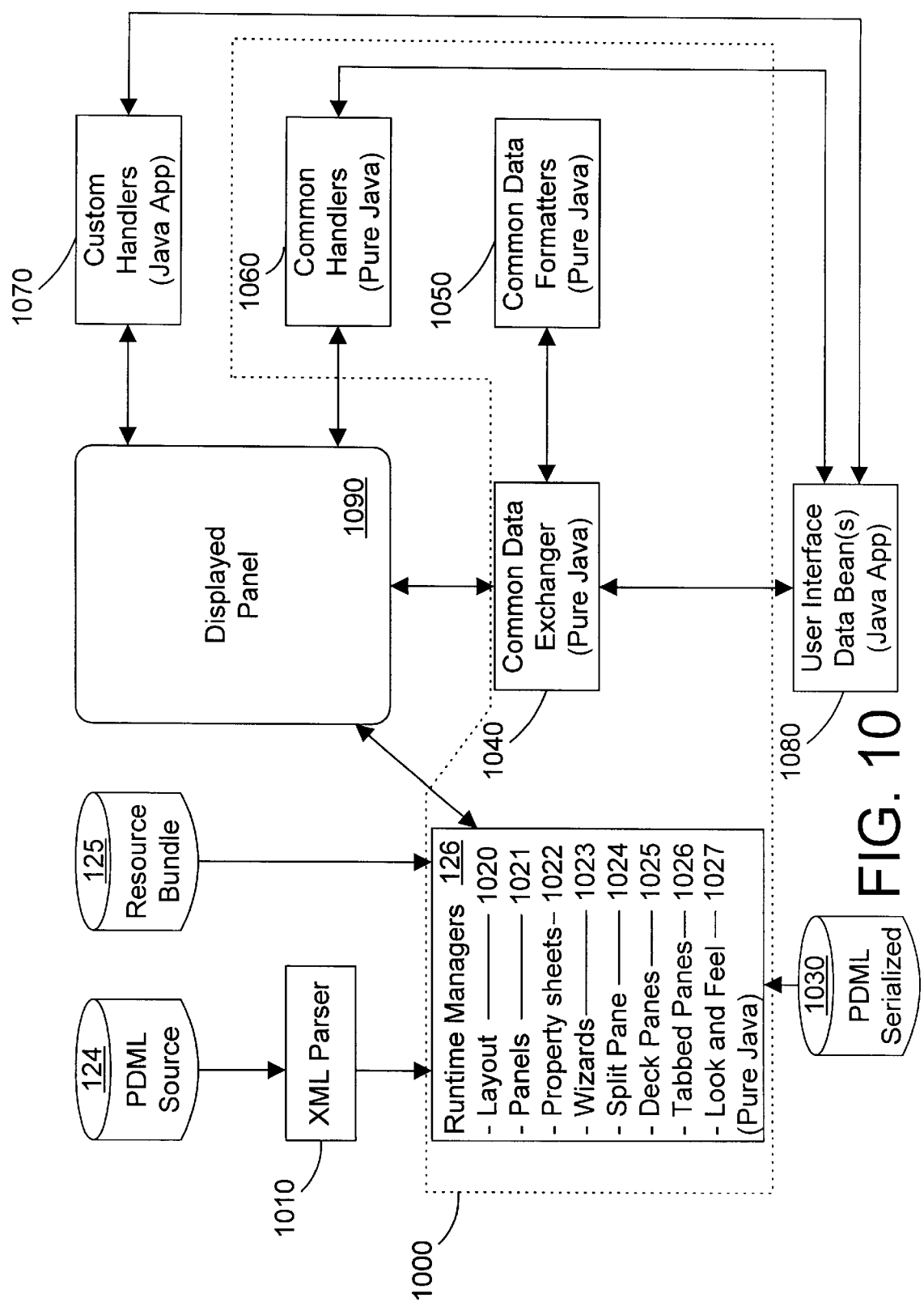
FIG. 10 is a block diagram of a framework and associated items that process and display PDML panels.

Associated with the PDML representation of user interface panels is a pure Java runtime framework that interprets the PDML and constructs the panels, using user interface components in the Java Foundation Class library (JFC). FIG. 10 illustrates the elements and flow through the user interface framework 1000. The user interface framework 1000 interprets PDML data that is obtained by either parsing a PDML document using XML parser 1010, or by loading a serialized panel definition 1030, which is a pre-parsed panel definition. Several run-time managers 126 are provided that dictate how the PDML data is displayed on displayed panel 1090. One of the run-time managers is a Java LayoutManager implementation 1020 that supports panel layouts defined using either Windows Dialog Logical Units (DLUs) or pixels. Pixel-based screens are scaled to the current screen size, using the screen resolution on which the panel was originally developed as a base. The panel manager 1021 is a run-time manager class that defines dialogs (modal and modeless), and online help information. The property sheet manager 1022 is a run-time manager class that determines how property sheets and property pages are displayed. The wizard run-time manager class 1023 determines how wizards and wizard pages are displayed. The split pane run-time manager class 1024 determines how aggregate panels are displayed using split panes. The deck pane run-time manager class 1025 determines how aggregate panels are displayed using a deck pane, which has several panes one atop the other like a deck of cards. The tabbed pane run-time manager class 1026 determines how aggregate panels are displayed in a tabbed pane. The look and feel run-time manager class 1027 determines the look and feel of the graphical user interface. Look and feel management is accomplished at runtime via the Pluggable Look and Feel (PLAF) manager in the Java Foundation Class library, which makes Windows looks like Windows and which makes AIX look like AIX. The default look and feel is the "metal" look and feel that is defined in the Java foundation classes, which doesn't correspond to a particular platform. These run-time managers 126 collectively determine the appearance of the displayed panel 1090 that results from processing a PDML file using framework 1000.

Framework 1000 also includes a common data exchanger class 1040 that handles the exchange of data between the user interface components and one or more Java data beans 1080 defined by the application, via method introspection on the data bean. In addition, common formatter classes 1050 and common handlers 1060 provide for data formatting, handling and validation that are specified in the PDML. In addition, custom handlers 1070 are provided that customize the function of displayed panel 1090 and can be extended. One example of suitable custom handlers 1070 include user interface component level event listeners that are specified in the PDML and can be extended. These listeners monitor (i.e., listen) for certain events to occur, and act on the occurrence of those events. The user interface framework 1000 of FIG. 10 provides a productive development environment for building user interface panels in PDML. The framework 1000 automatically handles the exchange of data, and the developer need only create one or more Data Beans and bind them to the panel components using tags in PDML. For enhanced capabilities, the developer may also specify one or more custom handlers 1070 that customize the function of displayed panel 1090.

Note that framework 1000 can be executed in a web browser, with the run-time managers 126 residing on a web server in archived form. In this scenario, when a user links to a web page that incorporates a Java applet developed using the PDML framework, the archived class library is downloaded to the web client, and all parsing and rendering is performed in the browser's execution space.

Panel Definition Markup Language thus defines an XML vocabulary for specifying the layout of user interface panels. This vocabulary is intended to be independent of both the user interface platform and the user interface implementation technology. The XML elements which make up the Panel Definition Markup Language are order-dependent, and are preferably specified in the order described herein. Names of PDML elements and attributes are case sensitive, but predefined character data and attribute values are not. The gettor and settor methods defined for each user interface component need not be implemented for the panel to function correctly. The user interface framework will write an informational message to the console for each method it was unable to locate, but the panel will still display normally. This allows developers to test the appearance of a panel without having to implement the associated data retrieval/storage mechanisms. In addition, a developer may not wish to provide the function associated with a particular access method. For example, it may not be desirable to allow users to update certain fields, in which case the settor methods might never be implemented for those fields.

PDML Tags

XML is used to specify many tags that provide the desired functionality of PDML. These tags are described in detail below.

PDML Root Element

Every XML vocabulary defines a root element which cannot be enclosed by any other elements. The root element for PDML is specified as follows:

<PDML version=version source=platform basescreensize=screensize>

In the version argument, the version of PDML used in this document is specified (such as 1.0). The platform argument specifies the platform on which the panels were originally defined, such as Windows or Java. If Windows is specified, the XML is assumed to have been generated by the panel conversion tool 128, and the logical panel coordinates contained in the PDML will be interpreted as Windows Dialog Logical Units (DLUs). If Java is specified, the PDML is assumed to have been generated by the GUI panel builder 127, or to have been created manually. When Java is specified, the logical panel coordinates contained in the PDML will be interpreted as pixels, which are the base units employed by the Java Foundation Classes. Of course, support for other platforms may be added as required by specifying other allowable possibilities for the platform argument. The basescreensize argument specifies the dimensions in pixels of the device on which the panels were originally defined. The basescreensize is specified as a width and a height, for example "1024×768". An end tag is required, and it must be the last element in the XML document.

PANEL Tag

One or more panels may be defined within the scope of a root PDML element. This is done using the PANEL tag:
<PANEL name=name>
where name is the text string which will be used to identify the panel programmatically. The panel name must be unique within the scope of a given PDML document. Within the scope of the PANEL tag, the TITLE, SIZE, ICON, and ACTIVATE tags (described below) may be specified.

TITLE Tag
<TITLE>title</TITLE>
The TITLE tag defines the text string that will be displayed in the title bar of the panel. An attempt will be made to load the string from the resource bundle associated with the panel definition, using title as the key. If the string is not found, the title string as it appears in the PDML will be displayed. The TITLE tag is required.

SIZE Tag
<SIZE>size</SIZE>
The SIZE tag defines the size of the panel in logical units, where size is expressed as a pair of integers "width,height". The SIZE tag is required.

ICON Tag
<ICON>icon</ICON>
The ICON tag defines the resource key of the filename string in the panel's resource bundle that identifies the binary file containing the image to be used as the icon for the panel. This tag is optional; if omitted, the standard Java window icon will be used.

ACTIVATE Tag
<ACTIVATE>class_name</ACTIVATE>
The ACTIVATE tag defines the fully qualified name of a handler class 1070 that will receive control when the panel is initially displayed. The framework will automatically create an object of the specified class, and notify the object when the panel is activated. This tag is optional.

Any number of user interface components may also be specified within the scope of the PANEL tag. These tags are described below. The names assigned to the components must be unique within the scope of a given panel definition.

Disabled Attribute

Many of the user interface panel components discussed below specify an attribute 'disabled="yes|no"'. The disabled attribute allows the programmer to request that the user interface component be initially displayed in a "disabled state", i.e. grayed out with user input disabled. The disabled attributes applies to many of the tags described below.

LABEL Tag

The LABEL tag creates a static text component of the specified size and location on the panel.
<LABEL name=name disabled="yes|no">
where name is the text string which will be used to identify the label programmatically. Within the scope of the LABEL tag, the TITLE and SIZE flags described above may be specified, along with the LOCATION, FLYOVER, and HELPALIAS tags, described below.

LOCATION Tag
<LOCATION>location</LOCATION>
The location tag defines the location of the label in logical units, where location is expressed as a pair of integers x-coordinate,y-coordinate. The panel's origin is the top left corner of the panel. This tag is required.

FLYOVER Tag
<FLYOVER>helptext</FLYOVER>
The FLYOVER tag defines the hover help text that will be displayed over the label. An attempt will be made to load the string from the resource bundle associated with the panel definition, using helptext as the key. If the string is not found, the helptext string as it appears in the PDML will be displayed. This tag is optional.

HELPALIAS Tag
<HELPALIAS>component_name</HELPALIAS>
The name of the user interface component whose help topic should be displayed when context help is requested for this component. This tag is optional.

IMAGE Tag

The IMAGE tag displays an image at the specified location on the panel.
<IMAGE name=name>
where name is the text string which will be used to identify the image programmatically. Within the scope of the IMAGE tag, the TITLE, LOCATION, SIZE, and FLYOVER tags that relate to the image to be displayed may be specified, as described above. Note that the application may define action handlers (e.g., 1070 in FIG. 10) for displaying a sequence of images at the location specified, effectively providing animation.

CUSTOM Tag

The CUSTOM tag adds a user-defined user interface component to the panel at the specified location.
<CUSTOM name=name>
where name is the text string that will be used to identify the component programmatically. Within the scope of the CUSTOM tag, the LOCATION and SIZE tags discussed above may be specified, as well as a MANAGERCLASS tag, described below.

MANAGERCLASS Tag
<MANAGERCLASS>class_name</MANAGERCLASS>
The MANAGERCLASS tag defines the fully qualified class name of a handler class 1070 that will manage the component on behalf of the user interface framework. This tag is required. The user interface framework will delegate creation of the component and management of its data to an instance of the specified handler class.

BUTTON Tag

The BUTTON tag creates a pushbutton of the specified size and location on the panel.
<BUTTON name=game disabled="yes|no">
where name is the text string which will be used to identify the button programmatically. Within the scope of the BUTTON tag, the TITLE, LOCATION, SIZE, FLYOVER, and HELPALIAS tags discussed above may be specified. In addition, the STYLE and ACTION tags may be specified for the button, as described below.

STYLE Tag
<STYLE>style</STYLE>
The STYLE tag defines a predefined style constant which controls the appearance of the button. The style argument may have a value of DEFAULT, which indicates that the button should receive the default emphasis, and indicates that the button's action should be invoked if the user presses the Enter key. This tag is optional.

ACTION Tag
<ACTION>action</ACTION>

The ACTION tag defines a predefined action constant which specifies the action to be taken when the user clicks the button. The action argument may have the value of COMMIT, CANCEL, or HELP. If the action argument is COMMIT, all pending changes to the data on the panel will be applied to the appropriate data objects, the changes will then be committed by calling the save method on the data objects, and the panel window will close. If the action argument is CANCEL, the panel window will close without saving any of the user's changes. If the action argument is HELP, a help browser window containing the overview help for the panel will be displayed. Alternatively, action may specify the fully qualified name of a handler class 1070 that will receive control when the button is clicked. The framework will automatically create an object of the specified class, and notify the object when the button is clicked. This tag is optional.

GROUPBOX Tag

The GROUPBOX tag creates a labeled box of the specified size and location on the panel.
<GROUPBOX name=name>
where name is the text string which will be used to identify the group box programmatically. Within the scope of the GROUPBOX tag, the TITLE, LOCATION, SIZE, and HELPALIAS tags discussed above may be specified.

RADIOBUTTON Tag

The RADIOBUTTON tag creates a radio button of the specified size and location on the panel.
<RADIOBUTTON name=name disabled="yes|no">
where name is the text string which will be used to identify the radio button programmatically. Within the scope of the RADIOBUTTON tag, the TITLE, LOCATION, SIZE, FLYOVER, and HELPALIAS tags described above may be specified, as well as the DATACLASS, ATTRIBUTE, SELECTED, and DESELECTED tags described below.

DATACLASS Tag
<DATACLASS>class_name</DATACLASS>

The DATACLASS tag defines the fully qualified class name of the data object which supplies the state of the radio button. An instance of this class is supplied to the class library by the application. This tag is optional.

ATTRIBUTE Tag
<ATTRIBUTE>attribute_name</ATTRIBUTE>

The ATTRIBUTE tag defines the property of the data object that contains the state of the radio button. This tag is optional, but must be present if the DATACLASS tag is specified. The gettor protocol for the ATTRIBUTE tag is a boolean is<attribute_name>( ), where the return value indicates whether the radio button is selected. The settor protocol for the ATTRIBUTE tag is a boolean set<attribute_name>(boolean selected), where "selected" indicates whether the radio button is selected.

SELECTED/DESELECTED Tags

The panel designer may elect to have certain actions performed when the radio button is selected, deselected, or both. Within the scope of the SELECTED tag, for example, the following tags may be specified:

<ENABLE>component_list</ENABLE>
    <DISABLE>component_list</DISABLE>
    <SHOW>component_list</SHOW>
    <HIDE>component_list</HIDE>
    <REFRESH>component_list</REFRESH>
    <DISPLAY>pane_list</DISPLAY> where component_list is a comma-separated list of user interface component identifiers. A component identifier is a string identifier of the form panel_name.component_name where panel_name is the name of the panel in which the component is defined, and component_name is the name of the component itself. If the target component is defined within the same panel as the radio button, the identifier need not be qualified with the panel name.

Pane_list is a comma-separated list of window pane identifiers. A window pane identifier is a string of the form subpanel_name.panel_name where subpanel_name is the name of the aggregate subpanel in which the panel resides, and panel_name is the name of the panel itself. An aggregate subpanel is a type of container which is capable of displaying multiple panels, such as a tabbed window control or a splitter window. If the target panel resides within the same aggregate subpanel as the radio button, the identifier need not be qualified with the subpanel name.

The following actions will be performed based on the tags specified.

ENABLE—The target component(s) will be enabled for user input.

DISABLE—The target component(s) will be disabled for user input.

SHOW—The target component(s) will be displayed on the panel.

HIDE—The target component(s) will be hidden from view.

REFRESH—The target component(s) will have their data refreshed. Changes made by the user will be applied, but not committed, before the refresh occurs.

DISPLAY—The target subpanel(s) will display the specified pane(s).

The use of these tags in conjunction with the SELECTED and DESELECTED tags allows the panel designer to define the desired user interface behavior without actually having to write any Java code.

CHECKBOX Tag

The CHECKBOX tag creates a check box of the specified size and location on the panel.
<CHECKBOX name=name disabled="yes|no">
where name is the text string which will be used to identify the check box programmatically. Within the scope of the CHECKBOX tag, the TITLE, LOCATION, SIZE, DATACLASS, ATTRIBUTE, SELECTED, DESELECTED, FLYOVER, and HELPALIAS tags discussed above may be specified.

BUTTONGROUP Tag

The BUTTONGROUP tag defines a group of push buttons, radio buttons or check boxes, only one of which may be selected at a time.
<BUTTONGROUP name=name disabled="yes|no">
where name is the text string which will be used to identify the button group programmatically. Within the scope of the BUTTONGROUP tag, the DATACLASS and ATTRIBUTE tags may be specified.

COMBOBOX Tag

The COMBOBOX tag creates a dropdown list box of the specified size and location on the panel. If the combo box is defined as editable, the user may supply data in an editable text field in addition to choosing one of the choices shown in the dropdown list.
<COMBOBOX name=name editable="yes"|"no" disabled="yes|no">
where name is the text string which will be used to identify the combo box programmatically. Within the scope of the COMBOBOX tag, the LOCATION, SIZE ATTRIBUTE, FLYOVER, and HELPALIAS tags discussed above may be specified. In addition, the CHOICE, SHORT, INTEGER, LONG, FLOAT, STRING, and FORMAT tags discussed below may be specified.

CHOICE Tag

If the strings to be inserted in a dropdown list are invariant, the choices may be specified using one or more CHOICE tags, as follows:

<CHOICE name=name> where name is the text string which will be used to identify the choice programmatically. Within the scope of the CHOICE tag, the TITLE, ENABLE, DISABLE, SHOW, HIDE, REFRESH, and DISPLAY tags discussed above may be specified. If the choices in a dropdown list can vary dynamically at runtime, then no choices should be specified in the PDML. The framework will call the data object identified on the DATACLASS tag to obtain the list of choices.

SHORT Tag

One of the following optional tags may be specified when the combo box is defined as editable:

<SHORT[minvalue="value1"][maxvalue="value2"]/>

The SHORT tag specifies that the value in the text field must be a short integer that lies within the range value1–value2. Both the minvalue and maxvalue attributes are optional; if omitted, the value will be checked against the allowable range for short integers in Java.

INTEGER Tag

<INTEGER[minvalue="value1"][maxvalue="value2"]/>

The INTEGER tag specifies that the value in the text field must be an integer that lies within the range value1–value2. Both the minvalue and maxvalue attributes are optional; if omitted, the value will be checked against the allowable range for integers in Java.

LONG Tag

<LONG[minvalue="value1"][maxvalue="value2"]/>

The LONG tag specifies that the value in the text field must be a long integer that lies within the range value1–value2. Both the minvalue and maxvalue attributes are optional; if omitted, the value will be checked against the allowable range for long integers in Java.

FLOAT Tag

<FLOAT [minvalue="value1"] [maxvalue="value2"]/>

The FLOAT tag specifies that the value in the text field must be a floating point number which must lie within the range value1–value2. Both the minvalue and maxvalue attributes are optional; if omitted, the value will be checked against the allowable range for the double data type in Java.

STRING Tag

<STRING [minlength="value1"] [maxlength="value2"]/>

The STRING tag specifies that the value in the text field must be a string whose length is within the range value1–value2. Both the minlength and maxlength attributes are optional, but at least one must be specified.

FORMAT Tag

<FORMAT>format</FORMAT>

The FORMAT tag defines a predefined format constant that specifies how the data in the text field should be interpreted when data is exchanged between a combo box component and its associated data object. The format argument may have one of the following values: PERCENT, DATE, TIME, and INTERNET ADDRESS, described below.

PERCENT—The data in the text field will be inspected to verify that it is a valid floating point value between 0.0 and 100.0.

DATE—The data in the text field will be inspected to verify that it contains a date that is formatted correctly for the current locale.

TIME—The data in the text field will be inspected to verify that it contains a time that is formatted correctly for the current locale.

INTERNET ADDRESS—The data in the text field will be inspected to verify that it is a valid dotted decimal address. If the data is found to be invalid according to the specified criteria, an appropriate error message will be displayed to the user.

Alternatively, the format argument may specify the fully qualified name of a handler class 1070 that will receive control when data is inserted into or extracted from a combo box. The framework will automatically create an object of the specified class, and call its format and parse methods to validate the data at the appropriate times.

TEXTFIELD Tag

The TEXTFIELD tag creates an editable text entry field of the specified size and location on the panel.

<TEXTFIELD name=name disabled="yes|no"> where name is the text string which will be used to identify the text field programmatically. Within the scope of the TEXTFIELD tag, the TITLE, LOCATION, SIZE, DATACLASS, ATTRIBUTE, SHORT, INTEGER, LONG, FLOAT, STRING, FORMAT, FLYOVER, and HELPALIAS tags discussed above may be specified.

TEXTAREA Tag

The TEXTAREA tag creates an editable multiline text entry field of the specified size and location on the panel.

<TEXTAREA name=name disabled="yes|no"> where name is the text string which will be used to identify the text area programmatically. Within the scope of the TEXTAREA tag, the TITLE, LOCATION, SIZE, DATACLASS, ATTRIBUTE, SHORT, INTEGER, LONG, FLOAT, STRING, FORMAT, FLYOVER, and HELPALIAS tags discussed above may be specified.

SLIDER Tag

The SLIDER tag creates an adjustable slider control of the specified size and location on the panel. The slider may be oriented horizontally or vertically.

<SLIDER name=name orientation="horizontal"|"vertical" disabled="yes|no"> where name is the text string which will be used to identify the text area programmatically. Within the scope of the SLIDER tag, the LOCATION, SIZE, DATACLASS, ATTRIBUTE, FLYOVER, and HELPALIAS tags discussed above may be specified. In addition, MINVALUE, MAXVALUE, MAJORTICKS, MINORTICKS, and ADJUST tags discussed below may also be specified.

MINVALUE Tag <MINVALUE>value</MINVALUE>

The MINVALUE tag defines a numeric constant which defines the lower bound of the slider. This tag is required.

MAXVALUE Tag

<MAXVALUE>value</MAXVALUE>

The MAXVALUE tag defines a numeric constant that defines the upper bound of the slider. This tag is required.

MAJORTICKS Tag

<MAJORTICKS>interval</MAJORTICKS>

The MAJORTICKS tag defines the interval at which labeled major ticks should be displayed, in slider units. This tag is optional; if omitted, no tick marks will be shown. Labels are in numeric slider units; custom labels are not supported. If this tag is present, snap-to-ticks is automatically set on.

MINORTICKS Tag

<MINORTICKS>interval</MINORTICKS>

The MINORTICKS tag defines the interval at which unlabeled minor ticks should be displayed, in slider units. This tag is optional, but is required if MAJORTICKS is specified.

ADJUST Tag
<ADJUST>class_name</ADJUST>

The ADJUST tag specifies the fully qualified name of a handler class 1070 that will receive control when the slider is adjusted. The framework will automatically create an object of the specified class, and notify the object whenever the slider is adjusted. This tag is optional.

PROGRESSBAR Tag

The PROGRESSBAR tag creates a progress indicator of the specified size and location on the panel.

<PROGRESSBAR name=name> where name is the text string which will be used to identify the progress bar programmatically. Within the scope of the PROGRESSBAR tag, the LOCATION, SIZE, MINVALUE, MAXVALUE, FLYOVER, and HELPALIAS tags may be specified. The progress bar component does not exchange data with its associated data object at predefined times. Instead, changes to the progress bar are effected by a handler object 1070 associated with another component on the panel, or with the activation handler for the panel.

LIST Tag

The LIST tag creates a list box of the specified size and location on the panel. The selection mode of the list box may be defined as single selection, single interval selection (only one contiguous interval of list items may be selected at a time), or multiple interval (no restriction on which items may be selected).

<LIST name=name selection="single"|"singleinterval"|"multiinterval" disabled="yes|no"> where name is the text string which will be used to identify the list box programmatically. Within the scope of the LIST tag, the LOCATION, SIZE, DATACLASS, ATTRIBUTE, SELECTED, DESELECTED, FLYOVER, and HELPALIAS tags discussed above may be specified. In addition, the ITEM and DOUBLECLICK tags defines below may also be specified.

ITEM Tag

If the strings to be inserted in the list box are invariant, the items may be specified using one or more ITEM tags, as follows:

<ITEM name=name> where name is the text string which will be used to identify the item programmatically. Within the scope of the ITEM tag, the TITLE, ENABLE, DISABLE, SHOW, HIDE, REFRESH, and DISPLAY tags discussed above may be specified.

DOUBLECLICK Tag
<DOUBLECLICK>class_name</DOUBLECLICK>

The DOUBLECLICK tag defines the fully qualified class name of a listener class that should be notified when the user double-clicks on an entry in the list. The framework will automatically create an object of the specified class, and notify the object when an entry in the list is double-clicked. This tag is optional.

TABLE Tag

The TABLE tag creates a multicolumn table of the specified size and location on the panel. The selection mode of the table may be defined as single selection, single interval selection (only one contiguous interval of table rows may be selected at a time), or multiple interval (no restriction on which rows may be selected).

<TABLE name=name selection="single"|"singleinterval"|"multiinterval" disabled="yes|no"> where name is the text string which will be used to identify the table programmatically. Within the scope of the TABLE tag, the LOCATION, SIZE, SELECTED, DESELECTED, DOUBLECLICK, FLYOVER, and HELPALIAS tags discussed above may be specified. In addition, the COLUMN tag discussed below may also be specified.

COLUMN Tag
<COLUMN></COLUMN>

The columns that are to appear in the table are defined using the COLUMN tag. Columns may be defined as editable, which allows the user to enter data into any cell in the column.

<COLUMN editable="yes"|"no">

Within the scope of the COLUMN tag, the TITLE, DATACLASS, ATTRIBUTE, and ITEM, tags discussed above may be specified. In addition, a DEFAULTWIDTH tag described below may also be specified. These tags describe actions which will be performed when the table cell is selected. If the column items in the table can vary dynamically at runtime, then no items should be specified in the PDML. The framework will call the data object identified on the DATACLASS tag to obtain the column items.

DEFAULTWIDTH Tag
<DEFAULTWIDTH>width</DEFAULTWIDTH>

The DEFAULTWIDTH tag defines the initial width of the column, in logical units. This tag is optional; if omitted, the columns will be displayed as having equal widths.

TREE Tag

The TREE tag displays a hierarchical tree of the specified size and location on the panel.

<TREE name=name disabled="yes|no"> where name is the text string which will be used to identify the tree programmatically. Within the scope of the TREE tag, the LOCATION, SIZE, DATACLASS, ATTRIBUTE, DOUBLECLICK, FLYOVER, and HELPALIAS tags discussed above may be specified. In addition, the ROOT/NODE and NODE tags discussed below may also be specified.

ROOT/NODE Tags

If the tree hierarchy is invariant, the hierarchy may be defined using the ROOT/NODE tag and one or more NODE tags. Both tags have identical syntax, but the ROOT/NODE tag is used to identify the first node in the hierarchy.

<ROOT/NODE name=name> where name is the text string which will be used to identify the node programmatically. Within the scope of the ROOT/NODE tag, the TITLE, ICON, ENABLE, DISABLE, SHOW, HIDE, REFRESH, and DISPLAY tags discussed above may be specified. In addition, the NODE tag described below may also be specified.

NODE Tag
<NODE></NODE>

The NODE tag identifies a node within the tree. Any number of child nodes may be specified, and the nodes may be nested to any depth. Within the scope of the NODE tag, the ENABLE, DISABLE, SHOW, HIDE, REFRESH, and DISPLAY tags may also be specified to indicate what action(s) should be taken when the tree item represented by the NODE tag is selected.

Subpanels and Nesting

In the preferred embodiment, three types of complex subpanels may be defined within the scope of the PANEL tag: split panes, deck panes, and tabbed panes. These subpanels may also nest within one another, which means they can also be declared in document scope (the scope of the PDML tag). Unlike panels, property sheets and wizards described below, subpanels are incapable of being defined in a standalone window or dialog.

SPLITPANE Tag

The SPLITPANE tag defines a subpanel containing two windows separated by a graphical divider. Each window consists of a panel defined using the Panel Definition Markup Language. The orientation of the two windows may be controlled via the orientation attribute.

<SPLITPANE name=name orientation="horizontal"|"vertical"> where name is the text string which will be used to identify the split pane programmatically. Within the scope of the SPLITPANE tag, the TITLE and LOCATION tags discussed above may be specified. In addition, the PANE tag described below may also be specified.

<PANE resource=resource_name name=panel_name type="panel"|"split"|"deck"|"tab"/>

The panel for each window is identified using the PANE tag. The resource_name argument is the resource bundle name associated with the panel, and panel_name is the name of the panel specified in the PDML document (the panel need not be defined in the same PDML document as the split pane declaration). The type argument provides the user interface framework with an indication of whether the panel is a simple panel, another split pane, a deck pane, or a tabbed pane. Note that no SIZE tag is needed. The size of the split pane is completely determined by the size of its constituent panels. When the split pane is displayed, the panels will appear in the order declared within the SPLITPANE tag.

DECKPANE Tag

The DECKPANE tag defines a subpanel containing a series of windows which are displayed one at a time. The subpanel acts as a stack or "deck" of windows. Each window consists of a panel defined using the Panel Definition Markup Language.

<DECKPANE name=name> where name is the text string which will be used to identify the deck pane programmatically. Within the scope of the DECKPANE tag, the TITLE, LOCATION, and PANE tags discussed above may be specified. Note that no SIZE tag is needed. The size of the deck pane is completely determined by the size of the largest of its constituent panels. The user interface framework provides the means for the application to access and display any of the deck pane panels at runtime.

TABBEDPANE Tag

The TABBEDPANE tag defines a subpanel containing a tabbed pane with one or more tabbed windows. Each window consists of a panel defined using the Panel Definition Markup Language. The placement of the tabs may be controlled via the placement attribute.

<TABBEDPANE name=name placement="top"|"bottom"|"left"|"right"> where name is the text string which will be used to identify the tabbed pane programmatically. Within the scope of the TABBEDPANE tag, the TITLE, LOCATION, and PANE tags discussed above may be specified. Note that no SIZE tag is needed. The size of the tabbed pane is completely determined by the size of the largest of its constituent panels. When the tabbed pane is displayed, the tabbed panels will appear in the order declared within the TABBEDPANE tag.

Property Sheets and Wizards

In addition to panels defined using the PANEL tag, two additional types of standalone windows are supported within the scope of the PDML tag: property sheets and wizards, as described below. Note that the user interface framework will set the correct platform look and feel for these aggregate panels, just as it does for individual panels.

PROPERTYSHEET Tag

The PROPERTYSHEET tag defines a property sheet containing a tabbed pane with one or more tabbed windows. Each window consists of a panel defined using the Panel Definition Markup Language. The standard OK, Cancel and Help buttons are provided.

<PROPERTYSHEET name=name> where name is the text string which will be used to identify the property sheet programmatically. Within the scope of the PROPERTYSHEET tag, the TITLE and ICON tags discussed above may be specified. In addition, the PAGE tag described below may also be specified.

PAGE Tag

<PAGE resource=resource_name name=panel_name/>

The panel for each property sheet page is identified using the PAGE tag. The resource_name is the resource bundle name associated with the panel, and panel_name is the name of the panel specified in the PDML document. The panel need not be defined in the same PDML document as the property sheet declaration. When the property sheet is displayed, the tabbed panels will appear in the order declared within the PROPERTYSHEET tag.

WIZARD Tag

The WIZARD tag defines a wizard panel containing a series of windows that guide the user through the performance of a particular task. Each window consists of a panel defined in PDML. Back, Next, Finish, Cancel and Help buttons are provided, as well as an optional "task list" on the left side of the wizard window, which shows the user's progress through the wizard by "checking off" each task as it is performed.

<WIZARD name=name> where name is the text string which will be used to identify the wizard programmatically. Within the scope of the WIZARD tag, the PAGE tag discussed above may be specified, in addition to the STEP tag described below.

STEP Tag

<STEP>title</STEP>

The left margin of the wizard may contain a list of steps required to accomplish the task which allow users to monitor their progress. The title argument is the text string which describes a step. An attempt will be made to load the string from the resource bundle associated with the wizard definition, using title as the key. If the string is not found, the title string as it appears in the PDML will be displayed. When the wizard is displayed, the steps will be shown in the order in which they are declared.

Figure 3:
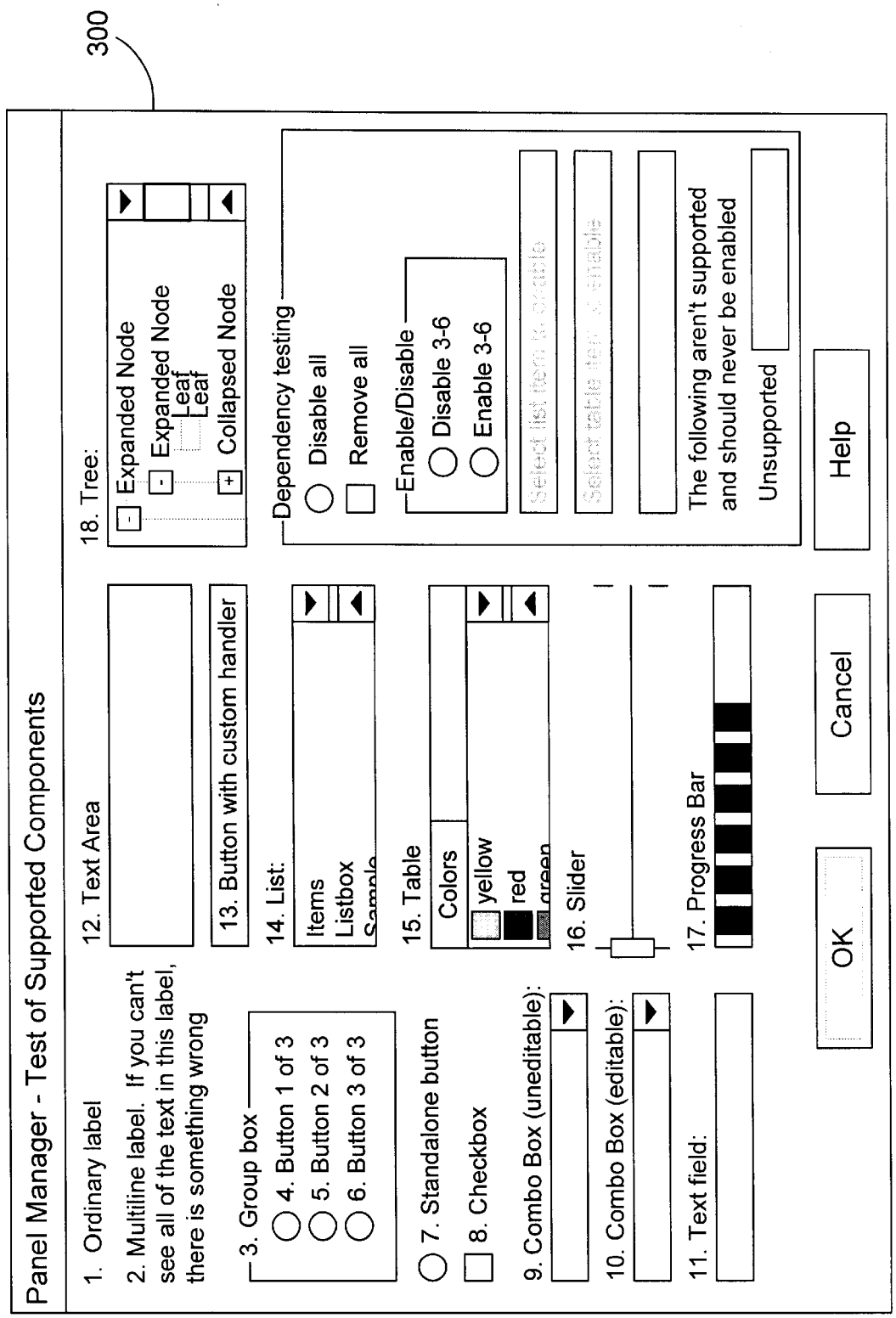
FIG. 3 is a display of a user interface panel defined using an editor for generating a Windows panel, such as that provided by Microsoft Visual C++.
Figure 11:
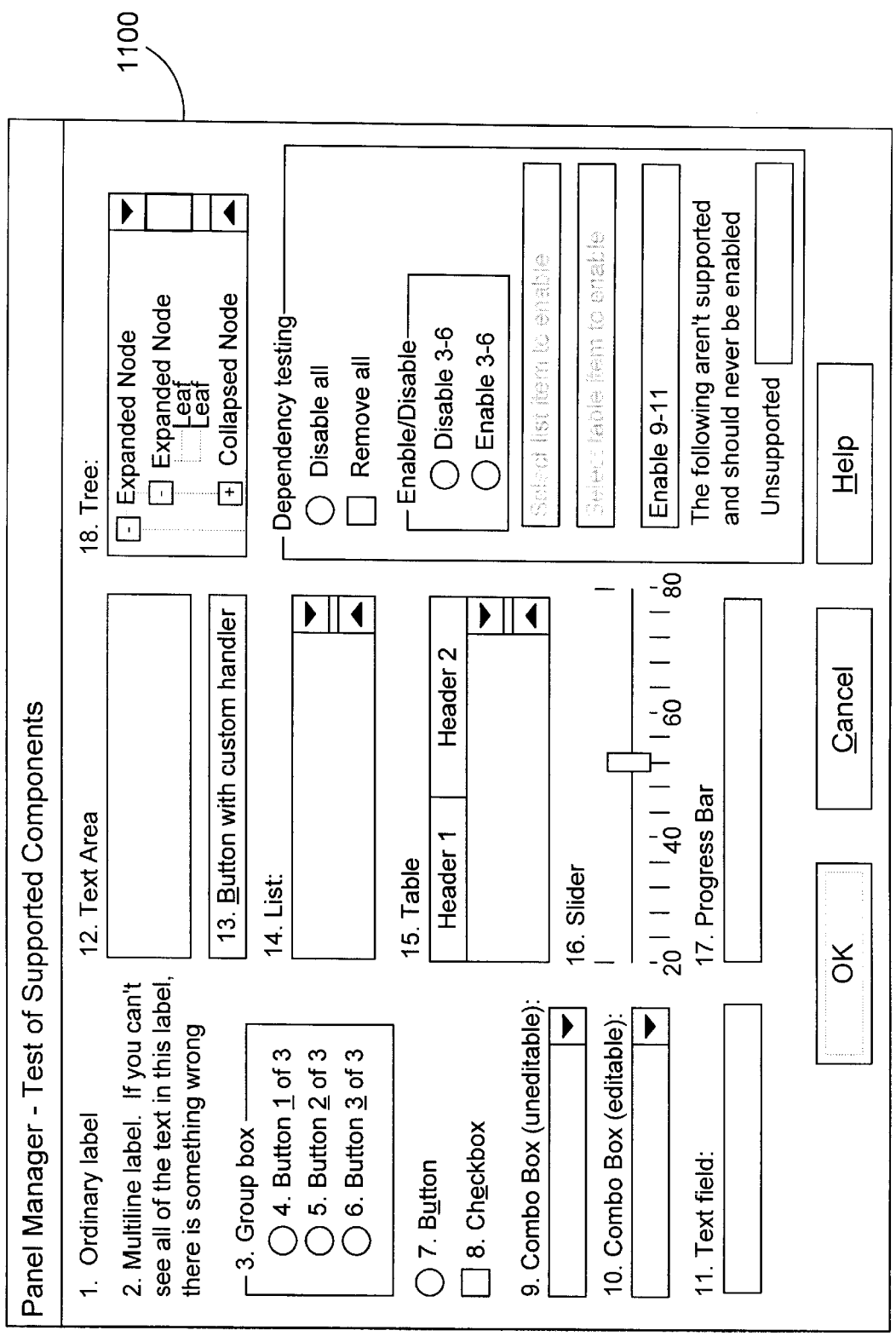
FIG. 11 is a display of the user interface panel in FIG. 3 when defined using PDML.

Referring to FIG. 11, a user interface panel 1100 provides similar components as the user interface panel 300 in FIG. 3, but instead of using a Windows resource script, the panel 1100 is defined in PDML. The PDML representation of the panel in FIG. 11 is shown in FIGS. 12A–12E. Note that a field in the panel begins with the tag name enclosed in < >marks, and ends with the same tag name preceded by a forward slash / to signal the end of that field, similar to the syntax used in HTML. Referring to FIG. 12A, first the PDML root is defined at line 1210. Next, a panel named IDD_SUPPORTED_COMPONENTS is defined in the TITLE tag in line 1220. The panel size of 400 by 300 logical units is then defined using the SIZE tag in line 1230. This ability to specify the exact size of the panel is one of the features that distinguishes PDML from HTML, and makes it more suitable for displaying panels. Next, a button named IDOK is defined in line 1240, with a size of 50 logical units wide by 14 logical units high, at a location of 109 logical units in the X (or horizontal) direction from the panel origin, and 279 logical units in the Y (or vertical) direction from the panel origin. The panel origin is arbitrarily defined as the upper left corner of the panel's display area. In similar fashion, each component is defined to have an origin at its upper left corner. All components are then specified in cartesian coordinates, with the first coordinate representing the distance in logical units to the right of the panel origin to the component origin, and the second coordinate representing the distance in logical units below the panel origin to the component origin. In this fashion, the size and location of the panel and components in the panel can be precisely determined by a programmer entering the appropriate size and coordinates for the panel in PDML.

The rest of the components in the panel of FIG. 11 are defined in the PDML code of FIGS. 12A through 12E. A correlation of the PDML code in FIGS. 12A–12E with the various components in the panel of FIG. 11 in light of the detailed tag discussion above provide a concrete example to help the reader understand the specific syntax and grammar that is used in PDML.

One specific embodiment of the panel conversion tool 128 of FIG. 1 is shown as item 1300 in FIG. 13. This particular panel conversion tool 1300 includes logic to convert a Windows resource script (.rc) file 1310 to a corresponding PDML file 1320 and associated resource bundle 1330. Note that PDML file 1320 corresponds to a suitable PDML panel 124 in FIG. 1, and resource bundle 1330 corresponds to a suitable resource bundle 125 in FIG. 1. The components defined in Windows resource script are similar enough to the components defined in PDML that the translation between the two is primarily an exercise in mapping a resource script component to a corresponding PDML component until all of the components in the Windows resource script have been processed. Panel conversion tool 1300 allows platform-specific user interface panels to be converted to platform-independent panels in PDML format with associated resource bundles, which allows for quickly and efficiently converting panels for use in platform-independent applications or applets.

Figure 14:
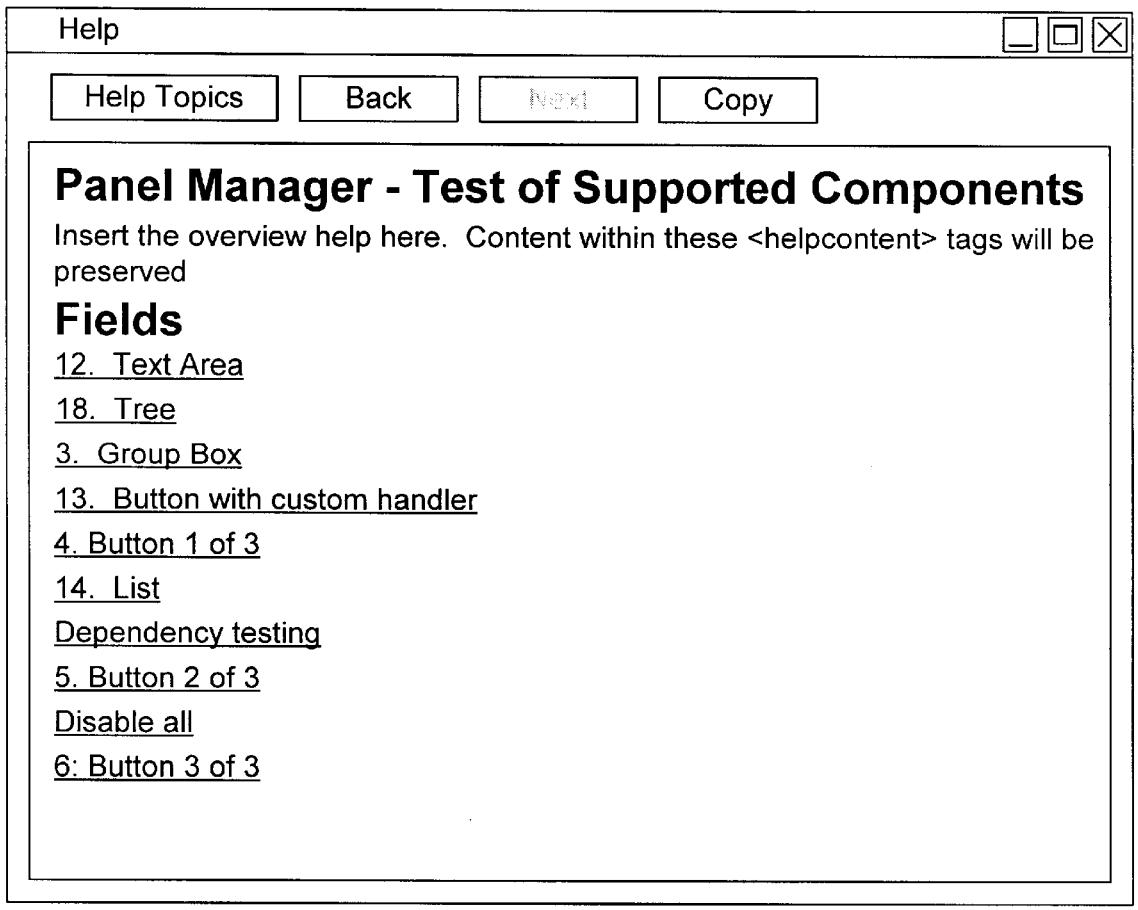
FIG. 14 displays the HTML output of the help generator tool of FIG. 1 that aids a programmer to develop context-sensitive help for a display panel.

A major benefit of a language like PDML is that all of the information for a given user interface panel is centralized in a single XML document. The preferred embodiments take full advantage of this feature by providing a help generator tool 129 of FIG. 1 that parses the PDML for a panel and produces an online help skeleton in HTML. A suitable example for a help skeleton for the user interface panel of FIG. 11 is shown in FIG. 14. Using the information imbedded in the PDML, the help generator tool 129 determines which user interface components require context sensitive help, and automatically assigns anchor identifiers that are derived from the names of the components. Thus, the Text Area component has a corresponding anchor identifier called Text Area. Help generator tool 129 then generates HTML skeleton 1410 which contains space for overview help for the panel, context help for each component, and task or "How do I . . . ?" help. The context help sections are presented in a logical top-to-bottom, left-to-right order according to how the user interface components are arranged on the panel. Online help text added to a previous version of a skeleton will be preserved on subsequent calls to the help generator tool 129.

Figure 15:
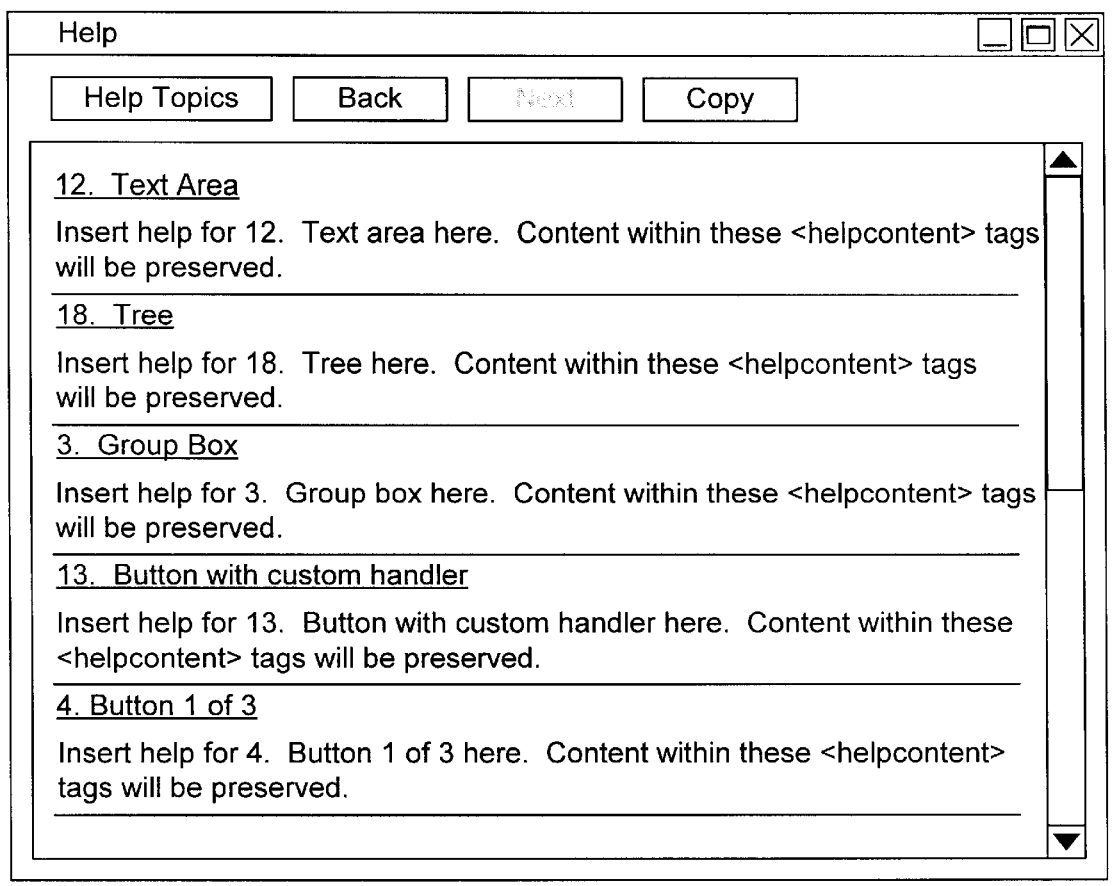
FIG. 15 displays a more detailed HTML help skeleton that is displayed when the Text Area link of FIG. 14 is selected.

When a user clicks the Help button on a panel, an HTML viewer pane will be displayed showing the overview help, with links to the component help sections, as shown in the panel of FIG. 14. If a user presses F1 while a pointing to a particular anchor identifier (corresponding to a user interface component), or if a user clicks on a particular anchor identifier, the HTML viewer will link directly to the context help for that anchor identifier, as shown by the panel in FIG. 15. The developer can then enter help text for each anchor identifier. This approach frees the panel developer from having to verify that links between user interface components and the corresponding context sensitive help material are functioning correctly. Support for aliasing a component to the context help for another component is also provided in the PDML tags discussed in detail above.

The Panel Definition Markup Language (PDML) described herein provides a platform-independent way for defining user interface panels. PDML is defined using extensible markup language (XML). A panel may be manually generated by programming directly in PDML. PDML is a markup language that uses tags in a similar fashion as HTML. PDML is thus much easier to learn and use than a complex programming language such as Java or C++. PDML provides for precise placement of components in a panel, unlike the Java layout managers. A PDML panel may also be generated graphically using a graphical editor. Using a graphical editor requires no programming skills at all to generate platform-independent user interface panels. A PDML panel may also be generated by converting a platform-specific user interface panel to a PDML panel using a conversion tool. In addition, a help generator tool facilitates the generation of context-sensitive help by providing a help skeleton with the appropriate links to panel components. The PDML and associates tools described herein provide a significant improvement over the prior art by allowing precise placement of components in a user interface panel without requiring detailed knowledge of object oriented programming, such as Java or C++.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the best mode of the invention disclosed in the preferred embodiments herein show specific tags with specific arguments, many variations in tags and arguments are within the scope of the present invention. The present invention expressly extends to any specification language that allows generating platform-independent user interface panels in a way that gives the developer precise control over the position of components in the panel.

We claim:

1. An apparatus comprising:
   at least one processor;
   a memory coupled to the at least one processor; and
   a specification language residing in the memory for defining at least one platform-independent user interface panel that may be displayed on a plurality of computer platforms without compilation, the specification language allowing the specification of exact location of a plurality of components in each panel, wherein the specification language comprises a panel definition markup language (PDML) that is defined using extensible markup language (XML).

2. The apparatus of claim 1 further comprising at least one platform-independent user interface panel defined using the specification language and residing in the memory for display to a user of the apparatus.

3. The apparatus of claim 1 wherein the PDML defines a plurality of tags that define the plurality of components in a panel and that specify the location within the panel for at least one of the plurality of components.

4. The apparatus of claim 1 wherein the exact location of the plurality of components in a selected panel are specified in cartesian coordinates that correspond to at least one area within the selected panel.

5. The apparatus of claim 1 wherein the specification language defines the size of the panel and the size of the plurality of components in the panel.

6. The apparatus of claim 1 further comprising a graphical panel builder residing in the memory and executed by the at least one processor that generates a platform-independent user interface panel in a graphical editor.

7. The apparatus of claim 6 wherein the graphical editor is a what-you-see-is-what-you-get (WYSIWYG) editor.

8. The apparatus of claim 1 further comprising a panel conversion tool residing in the memory and executed by the at least one processor that converts a user interface panel defined in a platform-specific format into a corresponding user interface panel in the specification language.

9. The apparatus of claim 1 further comprising a help generator tool residing in the memory and executed by the at least one processor that automatically builds a help skeleton corresponding to at least one of the plurality of components in a panel, thereby allowing the definition of a context-sensitive help panel by adding text and other information to the help skeleton.

10. An apparatus comprising:
   at least one processor;
   a memory coupled to the at least one processor;
   a specification language residing in the memory for defining at least one platform-independent user interface panel that may be displayed on a plurality of computer platforms without compilation, the specification language comprising a panel definition markup language (PDML) that is defined using extensible markup language (XML), the PDML defining a plurality of tags that define a plurality of components in a panel, the plurality of tags defining a location for at least one of the plurality of components in cartesian coordinates within the panel, the plurality of tags specifying the size of the panel and the size of the plurality of components in the panel;
   at least one platform-independent user interface panel defined using the specification language and residing in the memory for display to a user of the apparatus.

11. The apparatus of claim 10 further comprising a graphical panel builder residing in the memory and executed by the at least one processor that generates a platform-independent user interface panel in a graphical editor.

12. The apparatus of claim 11 wherein the graphical editor is a what-you-see-is-what-you-get (WYSIWYG) editor.

13. The apparatus of claim 10 further comprising a panel conversion tool residing in the memory and executed by the at least one processor that converts a user interface panel defined in a platform-specific format into a corresponding user interface panel in the specification language.

14. The apparatus of claim 10 further comprising a help generator tool residing in the memory and executed by the at least one processor that automatically builds a help skeleton corresponding to at least one of the plurality of components in a panel, thereby allowing the definition of a context-sensitive help panel by adding text and other information to the help skeleton.

15. A method for defining a platform-independent user interface panel, the method comprising the steps of:
   providing a panel editor that defines a platform-independent specification language for defining a plurality of platform-independent user interface panels that may be displayed on a plurality of computer platforms without compilation, wherein the specification language comprises a panel definition markup language (PDML) that is defined using extensible markup language (XML); and
   defining in the panel editor a platform-independent user interface panel using the platform-independent specification language to specify exact location of at least one of a plurality of components in the platform-independent user interface panel.

16. The method of claim 15 further comprising the step of displaying the platform-independent user interface panel.

17. A method for converting a platform-specific user interface panel to a platform-independent user interface panel, the method comprising the steps of:
   processing the platform-specific user interface panel to identify components and attributes; and
   representing the components and attributes in the platform-specific user interface panel that may be displayed on a plurality of computer platforms without compilation in a platform-independent specification language that allows the specification of exact location of the plurality of components in each panel, wherein the platform-independent specification language comprises a panel definition markup language (PDML) that is defined using extensible markup language (XML).

18. A method for generating a platform-independent user interface panel, the method comprising the steps of:
   graphically defining the user interface panel;
   graphically placing a plurality of components in the user interface panel; and
   converting the graphical representation of the user interface panel to a representation of the user interface panel in a platform-independent specification language that allows the specification of exact location of at least one of the plurality of components in each panel, wherein each panel may be displayed on a plurality of computer platforms without compilation, wherein the platform-independent specification language comprises a panel definition markup language (PDML) that is defined using extensible markup language (XML).

19. A method for generating context-sensitive help for a selected user interface panel, the method comprising the steps of:
   generating a selected user interface panel that may be displayed on a plurality of computer platforms without compilation using a platform-independent specification language, the selected user interface panel including a plurality of components, the platform-independent specification language allowing the specification of exact location of the plurality of components, wherein the platform-independent specification language comprises a panel definition markup language (PDML) that is defined using extensible markup language (XML);
   generating a help skeleton corresponding to the selected user interface panel, the help skeleton including a heading for at least one of the plurality of components.

20. The method of claim 19 further comprising the step of filling in help information relating to each heading.

21. A program product comprising:
   a specification language for defining at least one platform-independent user interface panel that may be displayed on a plurality of computer platforms without compilation, the specification language allowing the specification of exact location of a plurality of components in each platform-independent user interface panel, wherein the specification language comprises a panel definition markup language (PDML) that is defined using extensible markup language (XML); and signal bearing media bearing the specification language.

22. The program product of claim 21 wherein the signal bearing media comprises recordable media.

23. The program product of claim 21 wherein the signal bearing media comprises transmission media.

24. The program product of claim 21 wherein the PDML defines a plurality of tags that define the plurality of components in a panel and that specify the location within the panel for at least one of the plurality of components.

25. The program product of claim 21 wherein the exact location of the plurality of components in a selected panel are specified in cartesian coordinates that correspond to at least one area within the selected panel.

26. The program product of claim 21 wherein the specification language defines the size of the panel and the size of the plurality of components in the panel.

27. The program product of claim 21 further comprising a graphical panel builder on the signal bearing media that generates a platform-independent user interface panel in a graphical editor.

28. The program product of claim 27 wherein the graphical editor is a what-you-see-is-what-you-get (WYSIWYG) editor.

29. The program product of claim 21 further comprising a panel conversion tool on the signal bearing media that converts a user interface panel defined in a platform-specific format into a corresponding user interface panel in the specification language.

30. The program product of claim 21 further comprising a help generator tool on the signal bearing media that automatically builds a help skeleton corresponding to at least one of the plurality of components in a panel, thereby allowing the definition of a context-sensitive help panel by adding text and other information to the help skeleton.

31. A program product comprising:

a specification language residing in the memory for defining at least one platform-independent user interface panel that may be displayed on a plurality of computer platforms without compilation, the specification language comprising a panel definition markup language (PDML) that is defined using extensible markup language (XML), the PDML defining a plurality of tags that define a plurality of components in a panel, the plurality of tags defining the location for at least one of the plurality of components in cartesian coordinates within the panel, the plurality of tags specifying the size of the panel and the size of the plurality of components in the panel; and (B) signal bearing media bearing the specification language.

32. The program product of claim 31 wherein the signal bearing media comprises recordable media.

33. The program product of claim 31 wherein the signal bearing media comprises transmission media.

* * * * *